United States Patent
Cheng

(10) Patent No.: US 11,263,153 B1
(45) Date of Patent: Mar. 1, 2022

(54) DATA ACCESSING METHOD USING DATA PROTECTION WITH AID OF ADVANCED ENCRYPTION STANDARD PROCESSING CIRCUIT, AND ASSOCIATED APPARATUS

(71) Applicant: Silicon Motion, Inc., Hsinchu County (TW)

(72) Inventor: Chiao-Wen Cheng, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/086,481

(22) Filed: Nov. 2, 2020

(51) Int. Cl.
*G06F 12/00* (2006.01)
*G06F 13/00* (2006.01)
*G06F 13/28* (2006.01)
*G06F 12/14* (2006.01)
*G06F 12/02* (2006.01)
*G06F 13/16* (2006.01)
*G06F 21/79* (2013.01)
*G06F 21/60* (2013.01)

(52) U.S. Cl.
CPC ...... *G06F 12/1408* (2013.01); *G06F 12/0238* (2013.01); *G06F 13/1605* (2013.01); *G06F 13/1668* (2013.01); *G06F 21/602* (2013.01); *G06F 21/79* (2013.01)

(58) Field of Classification Search
CPC ............. G06F 12/1408; G06F 12/0238; G06F 21/602; G06F 21/79; G06F 21/72

USPC ......................................................... 711/163
See application file for complete search history.

(56) References Cited

U.S. PATENT DOCUMENTS

2010/0128874 A1* 5/2010 Scott-Nash ........... H04L 9/0894
380/255
2017/0177993 A1* 6/2017 Draelos ................ G06N 3/0454

* cited by examiner

*Primary Examiner* — Edward J Dudek, Jr.
*Assistant Examiner* — Sidney Li
(74) *Attorney, Agent, or Firm* — Winston Hsu

(57) ABSTRACT

A data accessing method using data protection with aid of an Advanced Encryption Standard (AES) processing circuit, and associated apparatus such as memory device, memory controller, and the AES processing circuit are provided. The data accessing method includes: utilizing the memory controller to start receiving first protected data corresponding to a read request from predetermined storage space; utilizing the AES processing circuit to start performing decryption processing on the first protected data to obtain decrypted data; utilizing the AES processing circuit to start performing encryption processing on other data to obtain encrypted data to be second protected data corresponding to a write request; and utilizing the memory controller to start sending the second protected data to the predetermined storage space, for storing the second protected data into the predetermined storage space. The AES processing circuit can perform encryption and decryption simultaneously.

10 Claims, 16 Drawing Sheets

DATA ACCESSING METHOD USING DATA PROTECTION WITH AID OF ADVANCED ENCRYPTION STANDARD PROCESSING CIRCUIT, AND ASSOCIATED APPARATUS

BACKGROUND OF THE INVENTION

1. Field of the Invention

The present invention is related to memory control, and more particularly, to a data accessing method using data protection with aid of an Advanced Encryption Standard (AES) processing circuit, and associated apparatus such as a memory device, a memory controller of the memory device, and the AES processing circuit implemented within the memory controller.

2. Description of the Prior Art

Developments in memory technology have enabled the wide application of various portable and non-portable memory devices (e.g. memory cards conforming to the SD/MMC, CF, MS, XD or UFS specifications, solid state drives (SSDs), embedded storage devices conforming to the UFS or EMMC specifications, etc.). Improving access control of memories in these memory devices remains an issue to be solved in the art.

NAND flash memories may comprise single level cell (SLC) and multiple level cell (MLC) flash memories. In an SLC flash memory, each transistor used as a memory cell may have either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, during a certain type of encryption/decryption processing, the associated calculation may rely on a dedicated hardware circuit of the hardware architecture of a controller integrated circuit (IC) to prevent encryption/decryption delay, and the dedicated hardware circuit may require a certain chip area of the controller IC. More particularly, the dedicated hardware circuit cannot perform encryption and decryption at the same time. When the dedicated hardware circuit is performing encryption, it cannot perform decryption. When the dedicated hardware circuit is performing decryption, it cannot perform encryption. As a result, implementing multiple dedicated hardware circuits may be required, causing the chip area and associated cost to be increased. In addition, the encryption/decryption processing may conform to the AES standards of the Institute of Electrical and Electronics Engineers (IEEE). In this situation, the dedicated hardware circuit cannot deal with an issue of ciphertext stealing bubble cycles. As a result, a memory device equipped with the controller IC may have a lower accessing speed when the encryption/decryption processing is required, causing the overall performance of an electronic device comprising the memory device to be degraded. Hence, there is a need for a novel method and associated architecture to improve the performance of the memory device without introducing a side effect or in a way that is less likely to introduce a side effect.

SUMMARY OF THE INVENTION

It is an objective of the present invention to provide a data accessing method using data protection with aid of an Advanced Encryption Standard (AES) processing circuit, and associated apparatus such as a memory device, a memory controller of the memory device, and the AES processing circuit implemented within the memory controller, in order to solve the above-mentioned problems.

It is another objective of the present invention to provide a data accessing method using data protection with aid of an AES processing circuit, and associated apparatus such as a memory device, a memory controller of the memory device, and the AES processing circuit implemented within the memory controller, in order to achieve optimal performance of the memory device.

At least one embodiment of the present invention provides a data accessing method using data protection with aid of an AES processing circuit, where the data accessing method is applicable to a memory controller of a memory device. The memory device may comprise the memory controller and a non-volatile (NV) memory, and the NV memory may comprise at least one NV memory element (e.g. one or more NV memory elements). The data accessing method may comprise: utilizing the memory controller to start receiving first protected data corresponding to a read request from predetermined storage space; after starting receiving the first protected data corresponding to the read request, utilizing the AES processing circuit to start performing decryption processing on the first protected data to obtain decrypted data, wherein the AES processing circuit is implemented within the memory controller; utilizing the AES processing circuit to start performing encryption processing on other data to obtain encrypted data to be second protected data corresponding to a write request; and after starting performing the encryption processing, utilizing the memory controller to start sending the second protected data to the predetermined storage space, for storing the second protected data into the predetermined storage space; wherein the AES processing circuit is arranged to perform at least one portion of the encryption processing and at least one portion of the decryption processing at the same time.

In addition to the above method, the present invention also provides a memory controller of a memory device, where the memory device comprises the memory controller and an NV memory. The NV memory may comprise at least one NV memory element (e.g. one or more NV memory elements). In addition, the memory controller comprises a processing circuit, and the processing circuit is arranged to control the memory controller according to a plurality of host commands from a host device, to allow the host device to access the NV memory through the memory controller. The memory controller further comprises a data protection circuit that is coupled to the processing circuit, and the data protection circuit is arranged to perform data protection. The data protection circuit comprises an AES processing circuit, and the AES processing circuit is arranged to perform AES processing, for data protection during data accessing. For example, the memory controller starts receiving first protected data corresponding to a read request from predetermined storage space; after starting receiving the first protected data corresponding to the read request, the memory controller utilizes the AES processing circuit to start performing decryption processing on the first protected data to obtain decrypted data, wherein the AES processing circuit is implemented within the memory controller; the memory controller utilizes the AES processing circuit to start performing encryption processing on other data to obtain encrypted data to be second protected data corresponding to a write request; and after starting performing the encryption processing, the memory controller starts sending the second protected data to the predetermined storage space, for storing the second protected data into the predetermined storage space; wherein the AES processing circuit performs at least one portion of the encryption processing and at least one portion of the decryption processing at the same time.

In addition to the above method, the present invention also provides the memory device comprising the above memory controller, wherein the NV memory is arranged to store information, and the memory controller is coupled to the NV memory, and is arranged to control operations of the memory device.

In addition to the above method, the present invention also provides an AES processing circuit of a memory controller of a memory device, where the memory device comprises the memory controller and an NV memory, the memory controller comprises the AES processing circuit, and the NV memory comprises at least one NV memory element (e.g. one or more NV memory elements). The AES processing circuit comprises multiple encoder-decoder (ENDEC) circuits having encoding and decoding capabilities, and an arbitrator that is coupled to the multiple ENDEC circuits. The multiple ENDEC circuits are arranged to perform parallel processing, wherein during the parallel processing, any of the multiple ENDEC circuits performs any of encoding and decoding. In addition, the arbitrator is arranged to manage the multiple ENDEC circuits, for performing the parallel processing. For example, the memory controller starts receiving first protected data corresponding to a read request from predetermined storage space; after starting receiving the first protected data corresponding to the read request, the memory controller utilizes the AES processing circuit to start performing decryption processing on the first protected data to obtain decrypted data, wherein the AES processing circuit is implemented within the memory controller; the memory controller utilizes the AES processing circuit to start performing encryption processing on other data to obtain encrypted data to be second protected data corresponding to a write request; and after starting performing the encryption processing, the memory controller starts sending the second protected data to the predetermined storage space, for storing the second protected data into the predetermined storage space; wherein the AES processing circuit performs at least one portion of the encryption processing and at least one portion of the decryption processing at the same time.

The present invention method and associated apparatus can guarantee that the memory device can operate properly in various situations without encountering the related art problems. For example, the data accessing method provides multiple control schemes for access control. With aid of the present invention method and associated apparatus, the memory device will not suffer from the existing problems of the related art, such as the increased chip area problem, the increased cost problem, the ciphertext stealing bubble cycles problem, etc.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide an apparatus for performing AES processing, where the apparatus may comprise at least one portion (e.g. a portion or all) of an electronic system, and may perform AES processing by using an AES processing circuit such as an AES engine. For example, the electronic system comprises a memory device such as a solid state drive (SSD), memory card, embedded storage device, etc., and the memory device is equipped with the AES processing circuit. Based on the hardware architecture of the AES processing circuit, the AES processing circuit can be configured to perform encryption/decryption processing for the memory device, and more particularly, perform encryption and decryption at the same time. In addition, the encryption/decryption processing may conform to the AES standards of the Institute of Electrical and Electronics Engineers (IEEE). As the hardware architecture of the AES processing circuit has been properly designed, the AES processing circuit can prevent an issue of ciphertext stealing bubble cycles. According to some viewpoints, as the AES processing circuit such as the AES engine can perform encryption and decryption at the same time, to allow the apparatus such as the memory device to perform processing respectively corresponding to different data transmission directions (e.g. a read-related data transmission direction and a write-related data transmission direction) at the same time in response to one or more read requests and one or more write requests, the AES engine can be regarded as a duplex AES engine.

Figure 1:
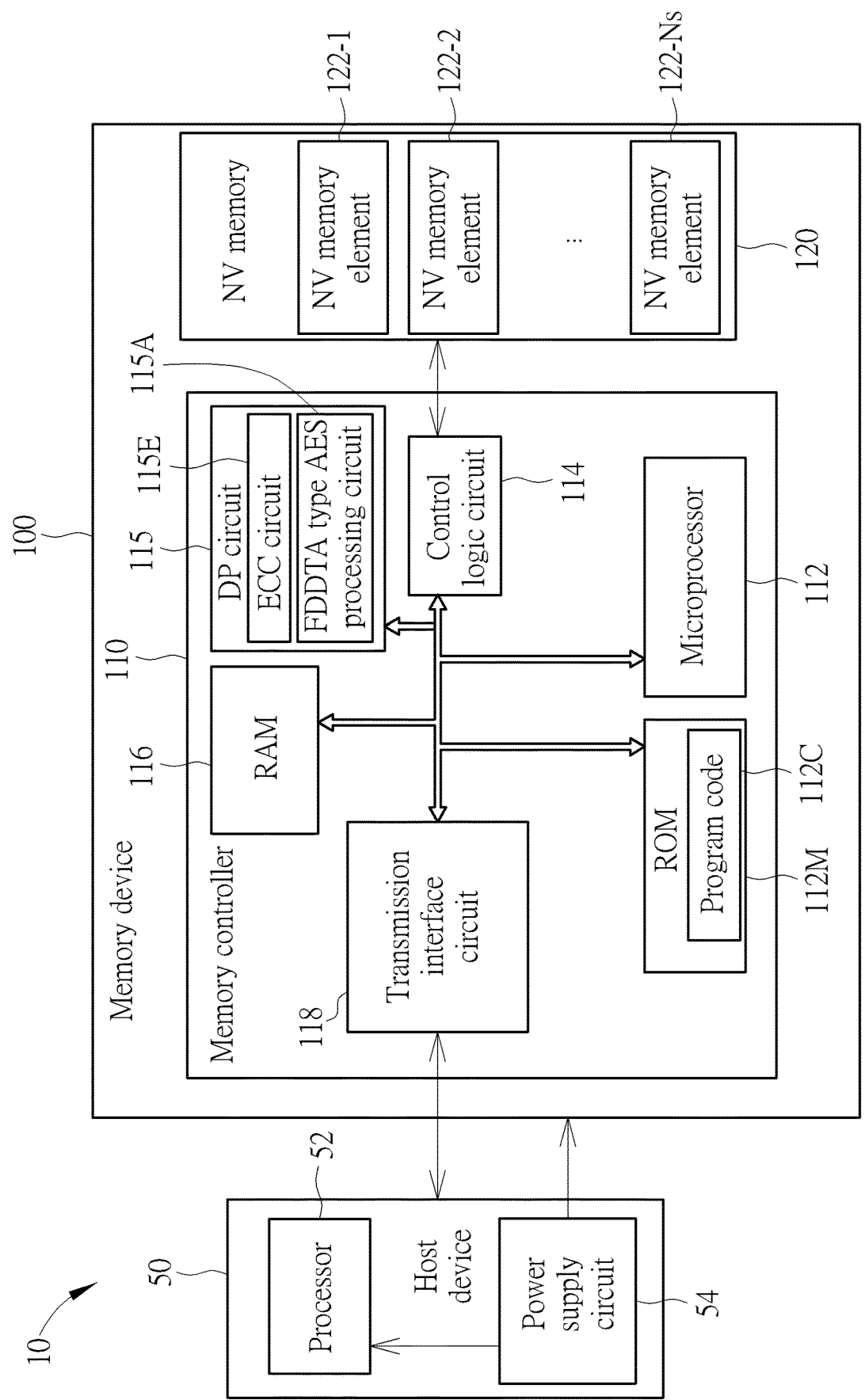
FIG. 1 is a diagram of an electronic system according to an embodiment of the present invention, where the electronic system comprises a host device and a memory device.

FIG. 1 is a diagram of an electronic system 10 according to an embodiment of the present invention, where the electronic system 10 comprises a host device 50 and a memory device 100, and the electronic system 10 and the memory device 100 can be taken as examples of the electronic system and the memory device mentioned above, respectively. The host device 50 may comprise at least one processor (e.g. one or more processors) which may be collectively referred to as the processor 52, and may further comprise a power supply circuit 54 that is coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, and a personal computer such as a desktop computer and a laptop computer. Examples of the memory device 100 may include, but are not limited to: a solid state drive (SSD), and an embedded storage device such as that conforming to Universal Flash Storage (UFS) or embedded MMC (eMMC) specifications. According to this embodiment, the memory device 100 may comprise a memory controller 110 and a non-volatile (NV) memory 120, where the memory controller 110 is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, ..., and 122-$N_S$, where "$N_S$" may represent a positive integer that is greater than one. For example, the NV memory 120 may be a flash memory, and the plurality of NV memory elements 122-1, 122-2, ..., and 122-$N_S$ may be a plurality of flash memory chips or a plurality of flash memory dies, but the present invention is not limited thereto.

As shown in FIG. 1, the memory controller 110 may comprise a processing circuit such as a microprocessor 112, a storage unit such as a read-only memory (ROM) 112M, a control logic circuit 114, a data protection circuit 115 (labeled "DP circuit" in FIG. 1, for brevity), a random access memory (RAM) 116, and a transmission interface circuit 118, and the data protection circuit 115 may comprise an error correction code (ECC) circuit 115E and a full-duplex-data-transmission-applicable (FDDTA) type AES processing circuit 115A, where the above components can be coupled to one another via a bus, and the FDDTA type AES processing circuit 115A can be taken as an example of the AES processing circuit mentioned above. Regarding "FDDTA" in the name of the FDDTA type AES processing circuit 115A, no matter whether data transmission between the host device 50 and the memory device 100 achieves full duplex or not, this AES processing circuit can support real time AES processing during data accessing of the memory device 100. More particularly, the FDDTA type AES processing circuit 115A can perform encryption and decryption at the same time to allow the data transmission between the host device 50 and the memory device 100 to achieve full duplex. The RAM 116 is implemented by a Static RAM (SRAM), but the present invention is not limited thereto. The RAM 116 can be arranged to provide the memory controller 110 with internal storage space. For example, the RAM 116 can be utilized as a buffer memory for buffering data. In addition, the ROM 112M of this embodiment is arranged to store a program code 112C, and the microprocessor 112 is arranged to execute the program code 112C to control the access of the NV memory 120. Note that, in some examples, the program code 112C can be stored in the RAM 116 or any type of memory. Further, the data protection circuit 115 can be configured to protect data and/or perform error correction, where the ECC circuit 115E can protect data and perform error correction, and the FDDTA type AES processing circuit 115A can protect data through encryption and/or decryption, and more particularly, can perform encryption and decryption at the same time to allow the memory device 100 (e.g. the memory controller 110) to process read and write requests at the same time. The transmission interface circuit 118 can conform to a specific communications specification (e.g. UFS specification), and can perform communications according to the specific communications specification, for example, perform communications with the host device 50 for the memory device 100.

In this embodiment, the host device 50 may transmit host commands and corresponding logical addresses to the memory controller 110 to access the memory device 100. The memory controller 110 receives the host commands and the logical addresses, and translates the host commands into memory operating commands (which may be simply referred to as operating commands), and further controls the NV memory 120 with the operating commands to perform reading, writing/programing, etc. on memory units (e.g. data pages) having physical addresses within the NV memory 120, where the physical addresses may be associated with the logical addresses. When the memory controller 110 perform an erase operation on any NV memory element 122-$n0$ of the plurality of NV memory elements 122-1, 122-2, ..., and 122-$N_S$ (in which "n0" may represent any integer in the interval [1, $N_S$]), at least one physical block of multiple physical blocks of the NV memory element 122-$n0$ may be erased, where each physical block of the multiple physical blocks may comprise multiple physical pages (e.g. data pages), and an access operation (e.g. reading or writing) may be performed on one or more physical pages.

When the host device 50 accesses the memory device 100 (e.g. the NV memory 120 therein, with aid of the memory controller 110), an accessing request (e.g. a read request, a write request, etc.) from the host device 50 may carry a logical address, and the logical address may comprise a logical block address (LBA) indicating a logical block, and more particularly, may further comprise a logical page address indicating a logical page in the logical block. The memory device 100 (e.g. the memory controller 110) can store and update at least one logical-to-physical (L2P) address mapping table (e.g. one or more L2P address mapping tables) in the NV memory 120, to manage mapping relationships between logical blocks and physical blocks according to a block-based mapping control scheme, and more particularly, to manage mapping relationships between logical blocks and pages and physical blocks and pages according to a page-based mapping control scheme, where the term "block" may represent logical/physical block in the above descriptions, but the present invention is not limited thereto. According to some embodiments, when discussing internal operations (e.g. operations regarding encryption/decryption) of the FDDTA type AES processing circuit 115A, the term "block" typically represents an intra-sector unit (e.g. a sub-unit within a sector, smaller than this sector, where the sector is a sub-unit of a page and is smaller than this page), rather than the aforementioned logical/physical block.

According to some embodiments, the memory device 100 may be implemented to be a memory card conforming to the SD/MMC, CF, MS, XD or UFS specifications, where the memory device 100 may be coupled to the host device 50 through an intermediate device such as a memory card reader, but the present invention is not limited thereto.

Figure 2:
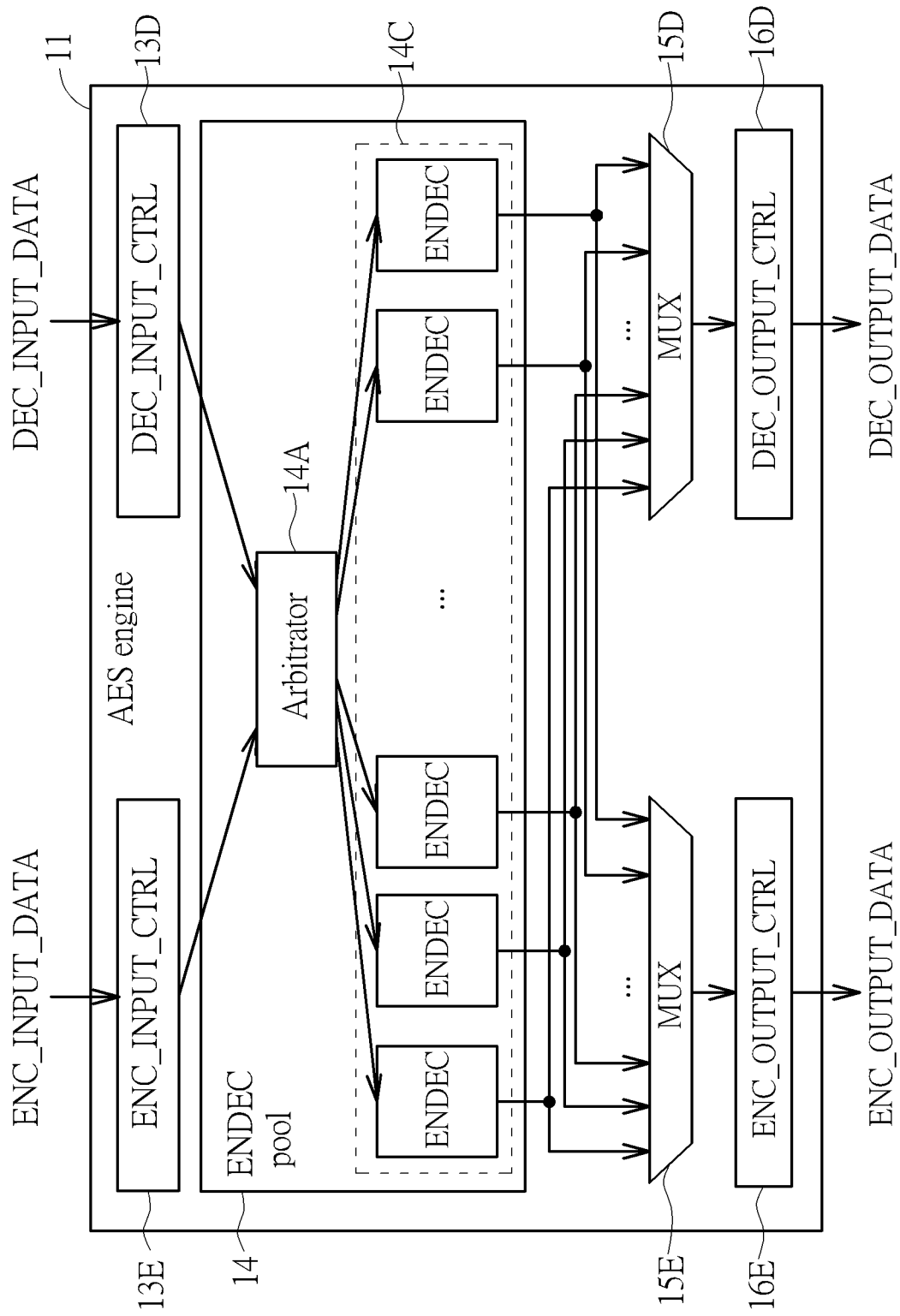
FIG. 2 is a diagram of an AES engine according to an embodiment of the present invention.

FIG. 2 is a diagram of an AES engine 11 according to an embodiment of the present invention, where the AES engine 11 can be taken as an example of the FDDTA type AES processing circuit 115A shown in FIG. 1. The AES processing circuit such as the AES engine 11 comprises multiple input control circuits respectively corresponding to an encoding path and a decoding path, such as an encoding input control circuit 13E on the encoding path and a decoding input control circuit 13D on the decoding path (respectively labeled "ENC_INPUT _CTRL" and "DEC_INPUT_CTRL" for brevity), and comprises an encoder-decoder (ENDEC) pool 14, where the ENDEC pool 14 comprises an arbitrator 14A and multiple ENDEC circuits 14C (labeled "ENDEC" for brevity) having encoding and decoding capabilities, and any ENDEC (e.g. each ENDEC) of the multiple ENDEC circuits 14C can act as an encoder on the encoding path or a decoder on the decoding path, depending on whether the arbitrator 14A configures the any ENDEC to be the encoder or the decoder. The AES processing circuit such as the AES engine 11 further comprises multiple multiplexers (MUXs) respectively corresponding to the encoding path and the decoding path, such as a MUX 15E on the encoding path and a MUX 15D on the decoding path, and comprise multiple output control circuits respectively corresponding to the encoding path and the decoding path, such as an encoding output control circuit 13E on the encoding path and a decoding output control circuit 13D on the decoding path (respectively labeled "ENC_OUTPUT_CTRL" and "DEC_OUTPUT_CTRL" for brevity).

The encoding input control circuit 13E and the decoding input control circuit 13D can input (e.g. receive) encoding input data ENC_INPUT _DATA on the encoding path and decoding input data DEC_INPUT _DATA on the decoding path into the ENDEC pool 14, respectively, for being delivered to at least two of the multiple ENDEC circuits 14C by the arbitrator 14A, respectively. For example, the arbitrator 14A can be configured to manage the multiple ENDEC circuits 14C, for performing parallel processing, and the multiple ENDEC circuits 14C can be configured to perform the parallel processing, where during the parallel processing, any of the multiple ENDEC circuits 14C can perform any of encoding (e.g. one or more AES processing operations regarding encryption) and decoding (e.g. one or more AES processing operations regarding decryption). In addition, the arbitrator 14A can select one or more ENDEC circuits from the multiple ENDEC circuits 14C in turn, to control the one or more ENDEC circuits to act as one or more encoders on the encoding path or one or more decoders on the decoding path. For example, the one or more ENDEC circuits such as the one or more encoders on the encoding path can perform encoding (e.g. the one or more AES processing operations regarding encryption) to generate one or more encoded results corresponding to the ending path. For another example, the one or more ENDEC circuits such as the one or more decoders on the decoding path can perform decoding (e.g. the one or more AES processing operations regarding decryption) to generate one or more decoded results corresponding to the ending path. Under control of the arbitrator 14A, the MUX 15E and the MUX 15D can multiplex (e.g. select) the one or more encoded results corresponding to the ending path and the one or more decoded results corresponding to the decoding path from all processed results of the multiple ENDEC circuits 14C, respectively. Additionally, the encoding output control circuit 13E and the decoding output control circuit 13D can output the one or more encoded results corresponding to the ending path and the one or more decoded results corresponding to the decoding path from the MUX 15E and the MUX 15D toward outside of the AES engine 11, respectively, to be encoding output data ENC_OUTPUT_DATA on the encoding path and decoding output data DEC_OUTPUT_DATA on the decoding path, respectively, but the present invention is not limited thereto.

For example, the AES engine 11 may comprise additional circuits such as logic circuits, registers, other MUXs, etc., for performing further processing when there is a need. More particularly, the AES engine 11 can utilize the registers and the other MUXs to control the associated data flows of the AES engine 11, and utilize the logic circuits to perform additional calculation operations on the one or more encoded results corresponding to the ending path and the one or more decoded results corresponding to the decoding path to generate respective subsequent calculation results of the encoding path and the decoding path, for being sent back to the encoding input control circuit 13E and the decoding input control circuit 13D through some of the other MUXs, respectively. As a result, the encoding input control circuit 13E and the decoding input control circuit 13D can forward the respective subsequent calculation results of the encoding path and the decoding path to the ENDEC pool 14, respectively, for being delivered to at least two of the multiple ENDEC circuits 14C by the arbitrator 14A, respectively.

Based on the architecture shown in FIG. 2, each ENDEC circuit of the multiple ENDEC circuits 14C can be regarded as an independent encoder or decoder, and the arbitrator 14A can dynamically allocate different sets of ENDEC circuits among the multiple ENDEC circuits 14C to perform encryption and decryption, respectively, to make the AES engine 11 be capable of processing encryption and decryption at the same time.

Figure 3:
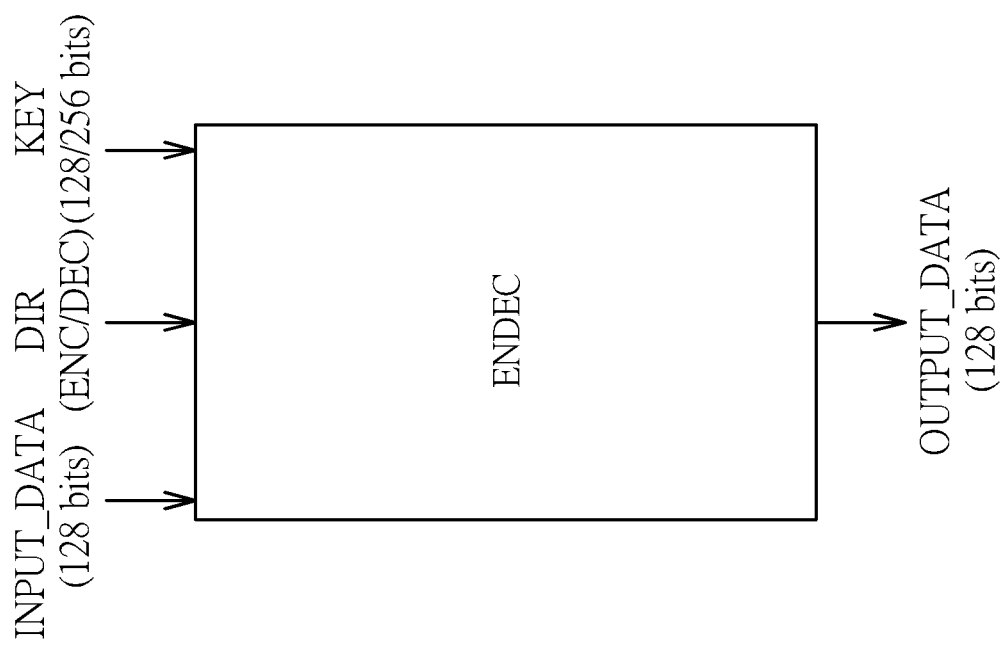
FIG. 3 illustrates an encoder-decoder (ENDEC) circuit applicable to the AES engine shown in FIG. 2 according to an embodiment of the present invention.

FIG. 3 illustrates an ENDEC circuit (labeled "ENDEC" for brevity) applicable to the AES engine 11 shown in FIG. 2 according to an embodiment of the present invention, where this ENDEC circuit can be taken as an example of any ENDEC circuit (e.g. each ENDEC circuit) of the multiple ENDEC circuits 14C. The input data INPUT_DATA of the ENDEC circuit may represent the encoding input data ENC_INPUT _DATA or the decoding input data DEC_INPUT_DATA, depending on direction information DIR (e.g. any state of the two states "ENC" and "DEC" thereof, where the two states "ENC" and "DEC" represent the encoder state and the decoder state, respectively) controlled by the arbitrator 14A. Similarly, the output data OUTPUT_DATA of the ENDEC circuit may represent the encoding output data ENC_OUTPUT_DATA or the decoding output data DEC_OUTPUT_DATA, depending on the direction information DIR (e.g. the any state of the two states "ENC" and "DEC" thereof) controlled by the arbitrator 14A. For example, when the direction information DIR (e.g. the state "ENC" thereof) indicates that the arbitrator 14A configures the ENDEC circuit to be the encoder on the encoding path, the input data INPUT DATA represents the encoding input data ENC_INPUT _DATA, and the output data OUTPUT_DATA represents the encoding output data ENC_OUTPUT_DATA. For another example, when the direction information DIR (e.g. the state "DEC" thereof) indicates that the arbitrator 14A configures the ENDEC circuit to be the decoder on the decoding path, the input data INPUT_DATA represents the decoding input data DEC_INPUT _DATA, and the output data OUTPUT_DATA represents the decoding output data DEC_OUTPUT_DATA.

For better comprehension, each of the input data INPUT_DATA and the output data OUTPUT_DATA may have a bit width of 128 bits, and the key information KEY for performing encryption or decryption may have a bit width of 128 bits or a bit width of 256 bits, depending on selection by the arbitrator 14A, but the present invention is not limited thereto. For example, the respective bit widths of the key information KEY, the input data INPUT_DATA and the output data OUTPUT_DATA may vary according to various requirements. In addition, the key information KEY may carry at least one key (e.g. one or more keys) regarding AES processing.

Figure 4:
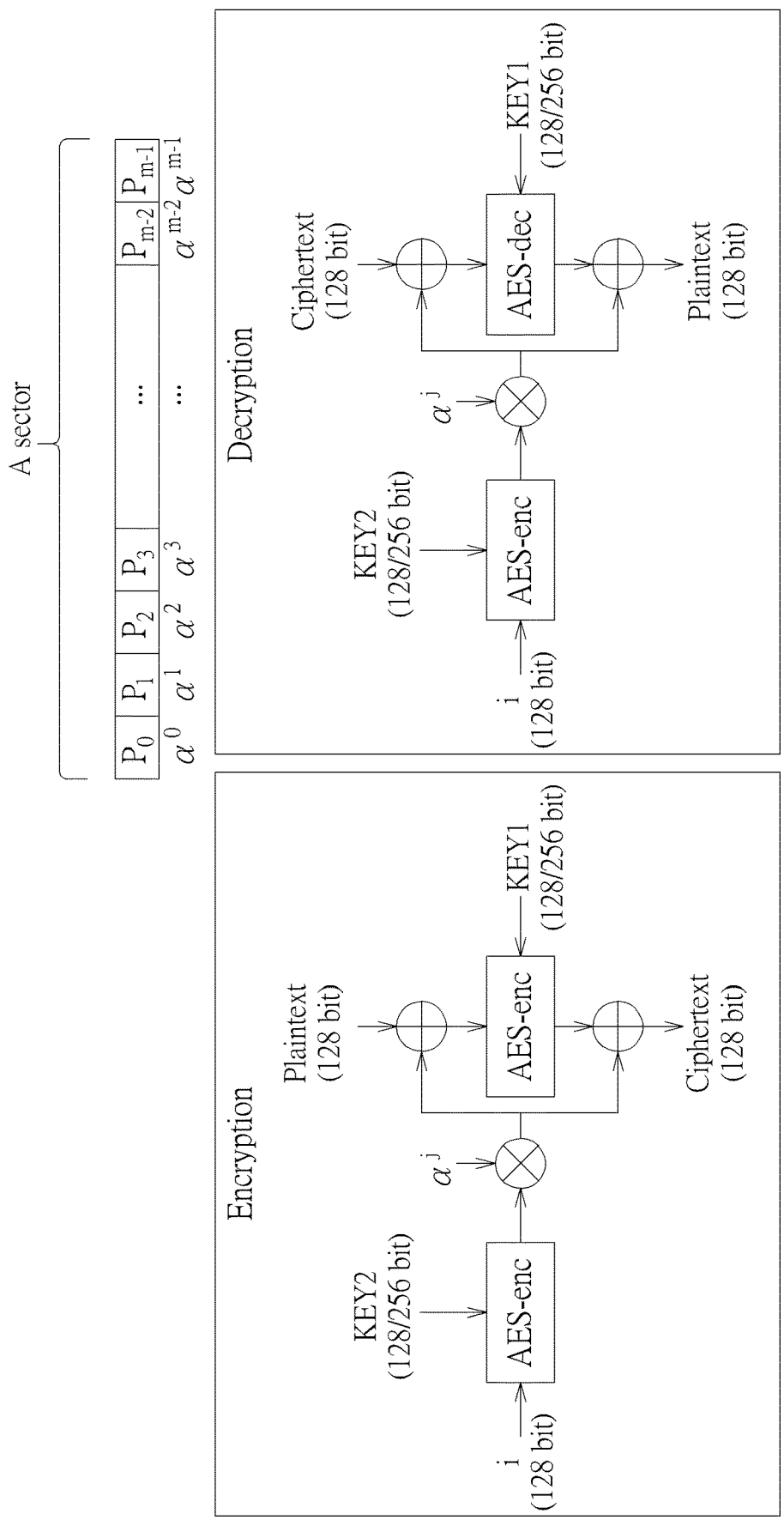
FIG. 4 illustrates a first type of Exclusive-OR (XOR)-Encrypt/Encryption-XOR (XEX)-based tweaked-codebook mode with ciphertext stealing (XTS) processing, hereinafter XTS processing, performed by the AES engine shown in FIG. 2 according to an embodiment of the present invention.

FIG. 4 illustrates a first type of Exclusive-OR (XOR)-Encrypt/Encryption-XOR (XEX)-based tweaked-codebook mode with ciphertext stealing (XTS) processing, hereinafter XTS processing, performed by the AES engine 11 shown in FIG. 2 according to an embodiment of the present invention, where a sector may include m 128-bit blocks such as $\{P_0, P_1, \ldots, P_{m-1}\}$. For better comprehension, some associated parameters may be described as follows:

(1) i is the tweak value, e.g. a logical block address (LBA) such as a logical address for accessing a logical block as requested by the host device 50, where a physical address of a physical block in the NV memory 120 may be associated with the LBA under control of the memory controller 110;

(2) j is the sequential number of the 128-bit block inside the sector, e.g. j=0, 1, . . . , or (m−1);

(3) $\alpha$ is the primitive element of $GF(2^{128})$ defined by $x^{128}+x^7+x^2+x+1$, where GF stands for Galois Field;

but the present invention is not limited thereto. For example, one or more terms may vary according to some viewpoints, and some implementation details may vary when there is a need.

As shown in the left half of FIG. 4, a set of encryption operations of this XTS processing may comprise utilizing two AES encoders (labeled "AES-enc" for brevity) such as two of the multiple ENDEC circuits 14C (e.g. two ENDEC circuits acting as encoders) and some logic circuits to encrypt a plaintext (e.g., having the bit width of 128 bits) according to the keys KEY1 and KEY2 (e.g., having the bit width of 128 bits or the bit width of 256 bits) and the corresponding parameters such as i, $\alpha^j$, etc. to generate a ciphertext (e.g., having the bit width of 128 bits). As shown in the right half of FIG. 4, a set of decryption operations of this XTS processing may comprise utilizing an AES encoder and AES decoder (respectively labeled "AES-enc" and "AES-dec" for brevity) such as two of the multiple ENDEC circuits 14C (e.g. two ENDEC circuits acting as an encoder and a decoder, respectively) and some logic circuits to decrypt a ciphertext (e.g., having the bit width of 128 bits) according to the keys KEY1 and KEY2 (e.g., having the bit width of 128 bits or the bit width of 256 bits) and the corresponding parameters such as i, $\alpha^j$, etc. to generate a plaintext (e.g., having the bit width of 128 bits).

Figure 5:
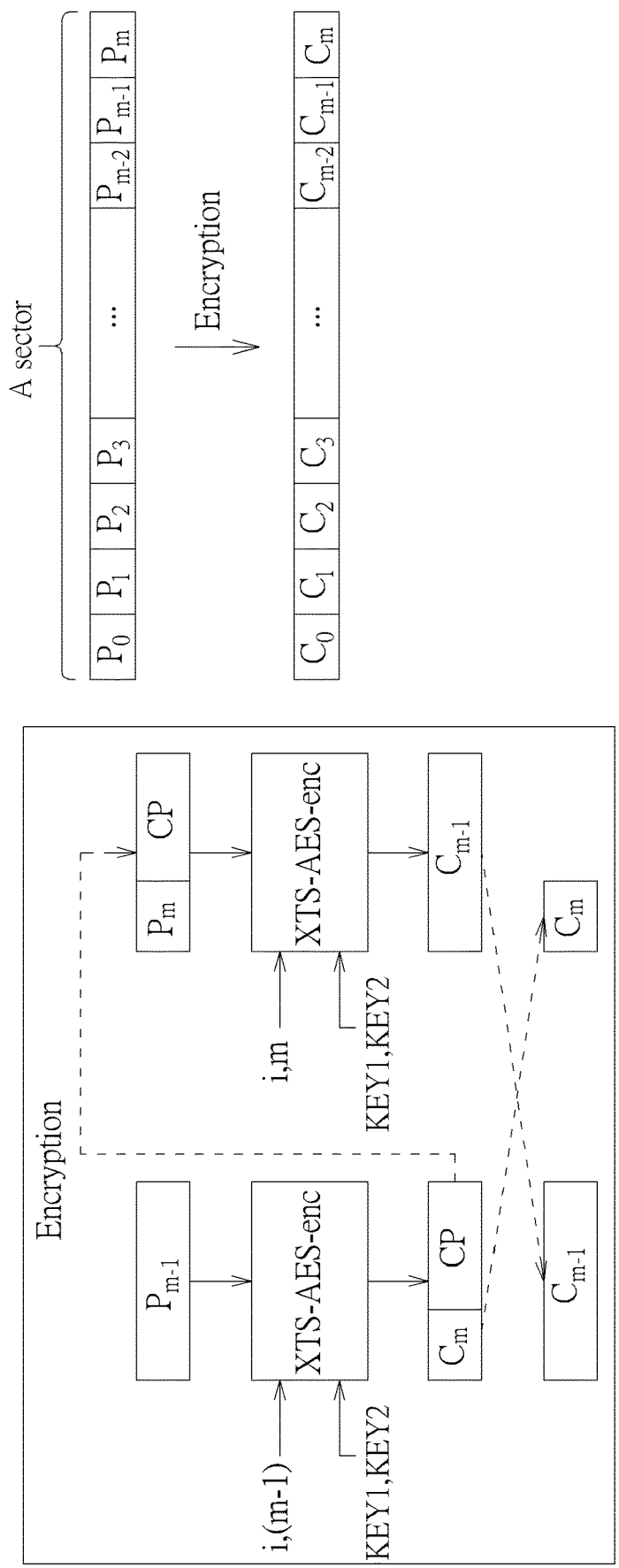
FIG. 5 illustrates encryption processing of a second type of XTS processing performed by the AES engine shown in FIG. 2 according to an embodiment of the present invention.
Figure 6:
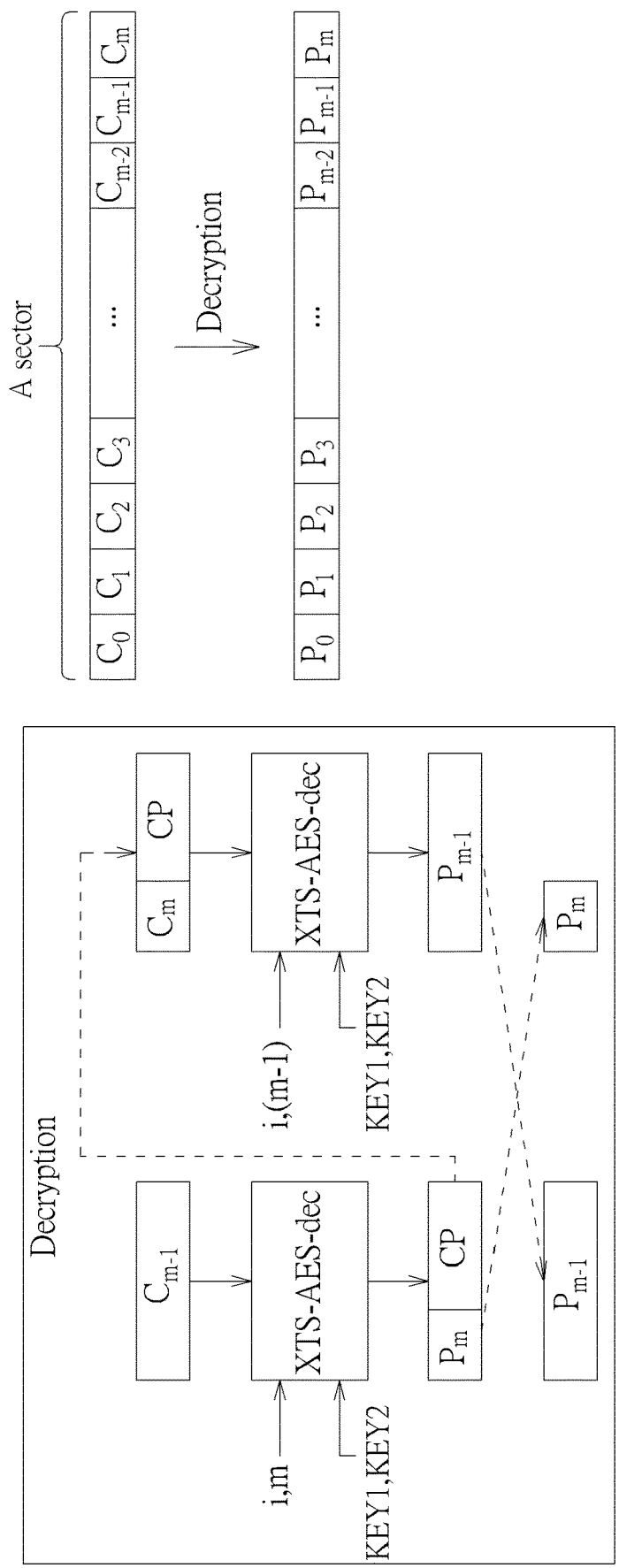
FIG. 6 illustrates decryption processing of the second type of XTS processing of the embodiment shown in FIG. 5.

FIG. 5 illustrates encryption processing of a second type of XTS processing performed by the AES engine 11 shown in FIG. 2 according to an embodiment of the present invention, and FIG. 6 illustrates decryption processing of the second type of XTS processing of this embodiment, where a sector may include (m+1) blocks, i.e. m 128-bit blocks such as $\{P_0, P_1, \ldots, P_{m-1}\}$ as well as a last block $P_m$, and the bit length of the last block may fall within a range of [1, 127] (bits). The AES engine 11 can perform (m−1) sets of encryption operations on the (m−1) 128-bit blocks $\{P_0, P_1, \ldots, P_{m-2}\}$ (e.g. (m−1) plaintexts) to generate the (m−1) encrypted results $\{C_0, C_1, C_{m-2}\}$ (e.g. (m−1) ciphertexts) in a similar manner as that shown in the left half of FIG. 4, and can perform other encryption operations on the remaining 128-bit blocks $\{P_{m-1}, P_m\}$ (e.g. two plaintexts) to generate the remaining encrypted results $\{C_{m-1}, C_m\}$ (e.g. two ciphertext) as shown in FIG. 5. The other encryption operations of this XTS processing may comprise utilizing multiple XTS-AES encoders (labeled "XTS-AES-enc" for brevity) such as two of the multiple ENDEC circuits 14C (e.g. two ENDEC circuits acting as encoders) and some logic circuits (e.g. one or more of adders, shifters, etc.) to encrypt the remaining 128-bit blocks $\{P_{m-1}, P_m\}$ (e.g. the two plaintexts) according to the keys KEY1 and KEY2 and the corresponding parameters such as i, m, (m−1), etc. to generate the remaining encrypted results $\{C_{m-1}, C_m\}$ (e.g. the two ciphertext), where a partial processing result CP of the processing result $\{C_m, CP\}$ obtained from encrypting the 128-bit block $P_{m-1}$ can be combined with the last block $P_m$, for performing further encryption processing to generate the encrypted result $C_{m-1}$.

In addition, the AES engine 11 can perform (m−1) sets of decryption operations on the (m−1) encrypted results $\{C_0, C_1, C_{m-2}\}$ (e.g. (m−1) ciphertexts) to generate the (m−1) 128-bit blocks $\{P_0, P_1, \ldots, P_{m-2}\}$ (e.g. (m−1) plaintexts) in a similar manner as that shown in the right half of FIG. 4, and can perform other decryption operations on the remaining encrypted results $\{C_{m-1}, C_m\}$ (e.g. two ciphertext) to generate the remaining 128-bit blocks $\{P_{m-1}, P_m\}$ (e.g. two plaintexts) as shown in FIG. 6. The other decryption operations of this XTS processing may comprise utilizing multiple XTS-AES decoders (labeled "XTS-AES-dec" for brevity) such as two of the multiple ENDEC circuits 14C (e.g. two ENDEC circuits acting as decoders) and some logic circuits (e.g. one or more of adders, shifters, etc.) to decrypt the remaining encrypted results $\{C_{m-1}, C_m\}$ (e.g. the two ciphertext) according to the keys KEY1 and KEY2 and the corresponding parameters such as i, m, (m−1), etc. to generate the remaining 128-bit blocks $\{P_{m-1}, P_m\}$ (e.g. the two plaintexts), where a partial processing result CP of the processing result $\{P_m, CP\}$ obtained from decrypting the encrypted results $C_{m-1}$ can be combined with the last encrypted results $C_m$, for performing further decryption processing to generate the 128-bit blocks $P_{m-1}$. For brevity, similar descriptions for this embodiment are not repeated in detail here.

Figure 7:
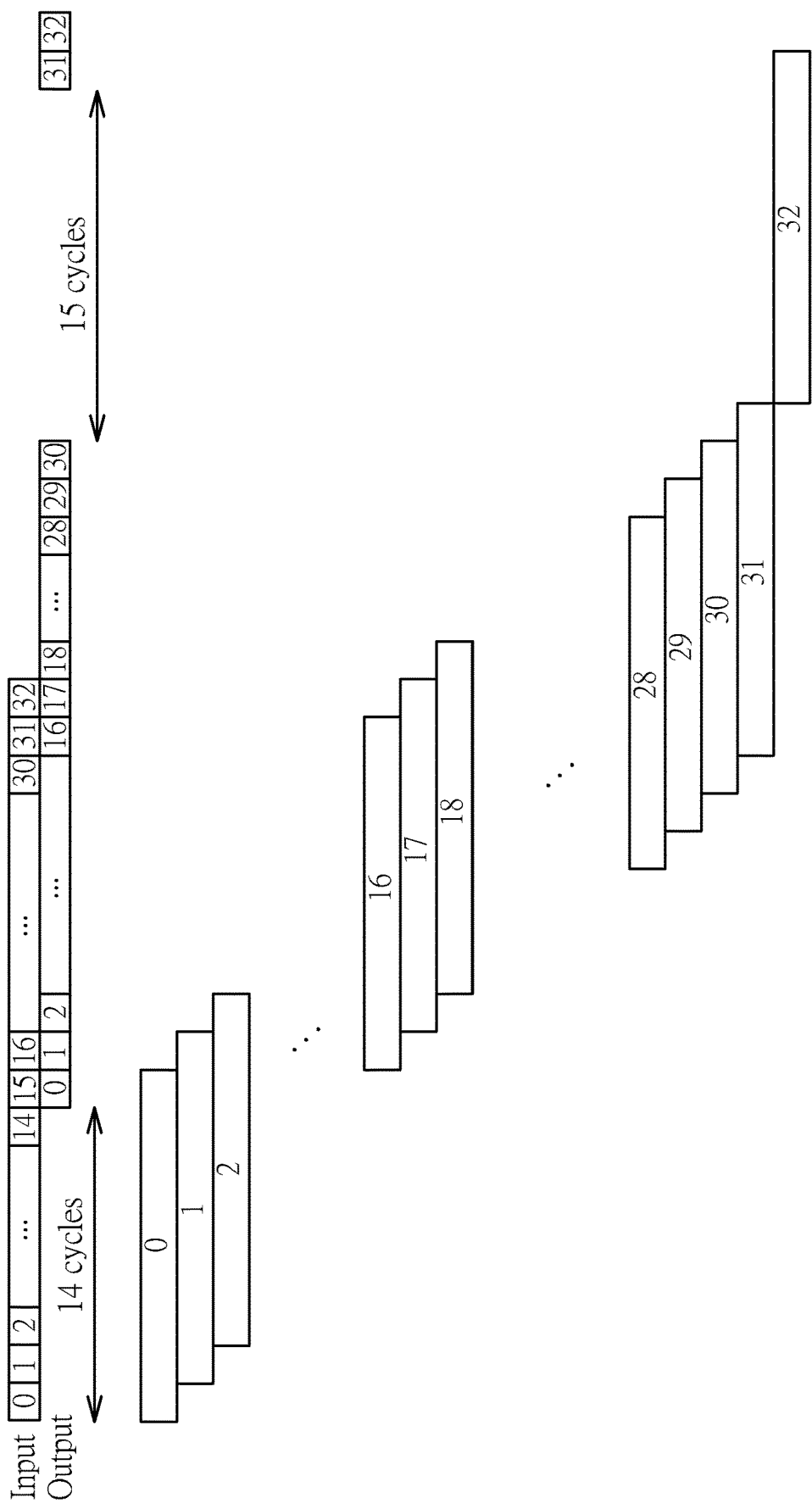
FIG. 7 illustrates an example of some blocks having a sequential transfer order.

FIG. 7 illustrates an example of a timing diagram of some blocks #0, #1, . . . , and #32 having a sequential transfer order, where the length of a sector in this example can be (512+2) bytes (B), i.e. 512B+2B. For better comprehension, assume that the AES engine 11 can temporarily disable a reorder function regarding changing the transfer order. The Input sequence and the Output sequence (respectively labeled "Input" and "Output" for brevity) may indicate the timing of starting inputting the blocks #0, #1, . . . , and #32 and the timing of starting outputting the blocks #0, #1, . . . , and #32, respectively. As shown in the upper left of FIG. 7, it may take at least fourteen cycles before the AES engine 11 can completely input (e.g. receive) and process the block #0. When completely inputting a certain block such as any of the blocks #0, #1, . . . , and #30, the AES engine 11 can immediately complete the associated processing of this block and start outputting this block. As shown in the rightmost of FIG. 7, there is a lag of at least fifteen cycles before the AES engine 11 can complete all processing of the blocks #31 and #32 and start outputting the blocks #31 and #32.

Figure 8:
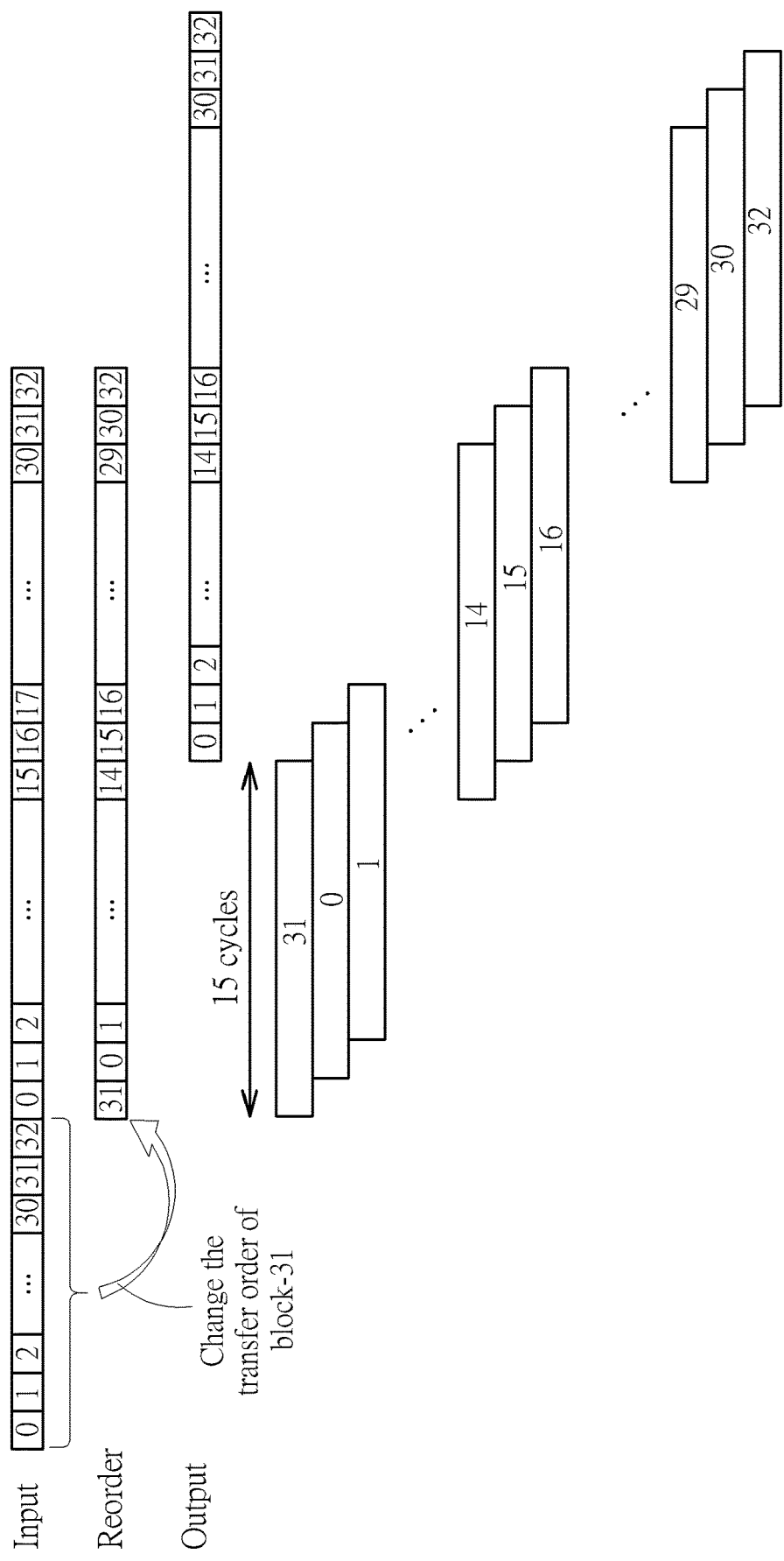
FIG. 8 illustrates a timing diagram of ciphertext stealing applicable to the AES engine shown in FIG. 2 according to an embodiment of the present invention.

FIG. 8 illustrates a timing diagram of ciphertext stealing applicable to the AES engine 11 shown in FIG. 2 according to an embodiment of the present invention. In comparison with the example shown in FIG. 7, the AES engine 11 can change the transfer order of any set of blocks #0, #1, . . . , and #32 (e.g. each set of blocks #0, #1, . . . , and #32) among multiple sets of blocks (e.g. a first set of blocks #0, #1, . . . , and #32, a second set of blocks #0, #1, . . . , and #32, etc.). The Input sequence (labeled "Input" for brevity) may indicate the timing of starting inputting the first set of blocks #0, #1, . . . , and #32 and the second set of blocks #0, #1, . . . , and #32, respectively, and the Reorder sequence and the Output sequence (respectively labeled "Reorder" and "Output" for brevity) may indicate the timing of starting processing a first set of reordered blocks #0, #1, . . . , and #32 (e.g. the reordered version of the first set of blocks #0, #1, . . . , and #32) and the timing of starting outputting the first set of reordered blocks #0, #1, . . . , and #32, respectively. As shown in FIG. 8, the AES engine 11 can change the transfer order of at least one portion of the any set of blocks #0, #1, . . . , and #32 (e.g. the first set of blocks #0, #1, . . . , and #32), and more particularly, change the transfer order of the block #31 among all blocks of this set of blocks #0, #1, . . . , and #32 to generate a corresponding set of reordered blocks #0, #1, . . . , and #32 such as the first set of reordered blocks #0, #1, . . . , and #32 (labeled "Change the transfer order of block-31" for brevity). In addition, it may take at least fifteen cycles before the AES engine 11 can completely process the block #0 of the first set of reordered blocks #0, #1, . . . , and #32. When completely processing a certain block such as any of the first set of reordered blocks #0, #1, . . . , and #32, the AES engine 11 can immediately complete the associated processing of this block and start outputting this block. As a result, a lag such as that shown in the rightmost of FIG. 7 will not occur in this embodiment.

Figure 9:
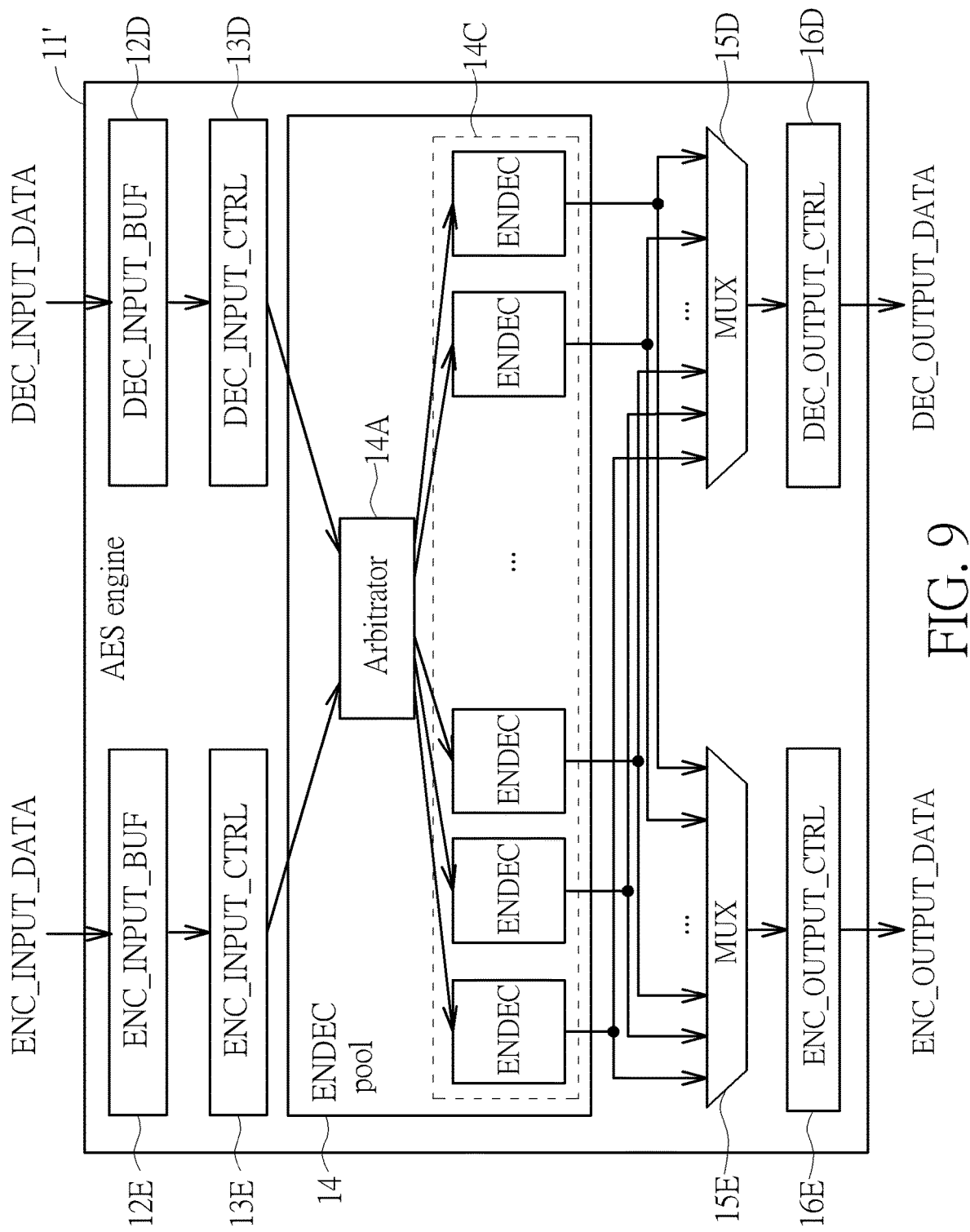
FIG. 9 is a diagram of an AES engine according to another embodiment of the present invention.

FIG. 9 is a diagram of an AES engine 11' according to another embodiment of the present invention, where the AES engine 11' can be taken as an example of the FDDTA type AES processing circuit 115A shown in FIG. 1, and can replace the AES engine 11 shown in FIG. 2 to achieve better performance of the memory device 100. In comparison with the architecture shown in FIG. 2, the AES engine 11' further comprises two input buffers such as an encoding path input buffer 12E on the encoding path and a decoding path input buffer 12D on the decoding path (respectively labeled "ENC_INPUT _BUF" and "DEC_INPUT _BUF" for brevity). Based on the architecture shown in FIG. 9, the AES engine 11' can utilize the encoding path input buffer 12E and the decoding path input buffer 12D to store the encoding input data ENC_INPUT_DATA and the decoding input data DEC_INPUT _DATA, respectively, and utilize the encoding input control circuit 13E and the decoding input control circuit 13D to input (e.g. receive) the encoding input data ENC_INPUT _DATA and the decoding input data DEC_INPUT _DATA into the ENDEC pool 14 according to a predetermined order (e.g. the order of the Reorder sequence shown in FIG. 8), respectively, for being delivered to the at least two of the multiple ENDEC circuits 14C by the arbitrator 14A, respectively. As a result, the AES engine 11' can convert the encoding input data ENC_INPUT _DATA and the decoding input data DEC_INPUT _DATA into their reordered versions for performing encryption and decryption, respectively, thereby removing bubble cycles during ciphertext stealing. For brevity, similar descriptions for this embodiment are not repeated in detail here.

Figure 10:
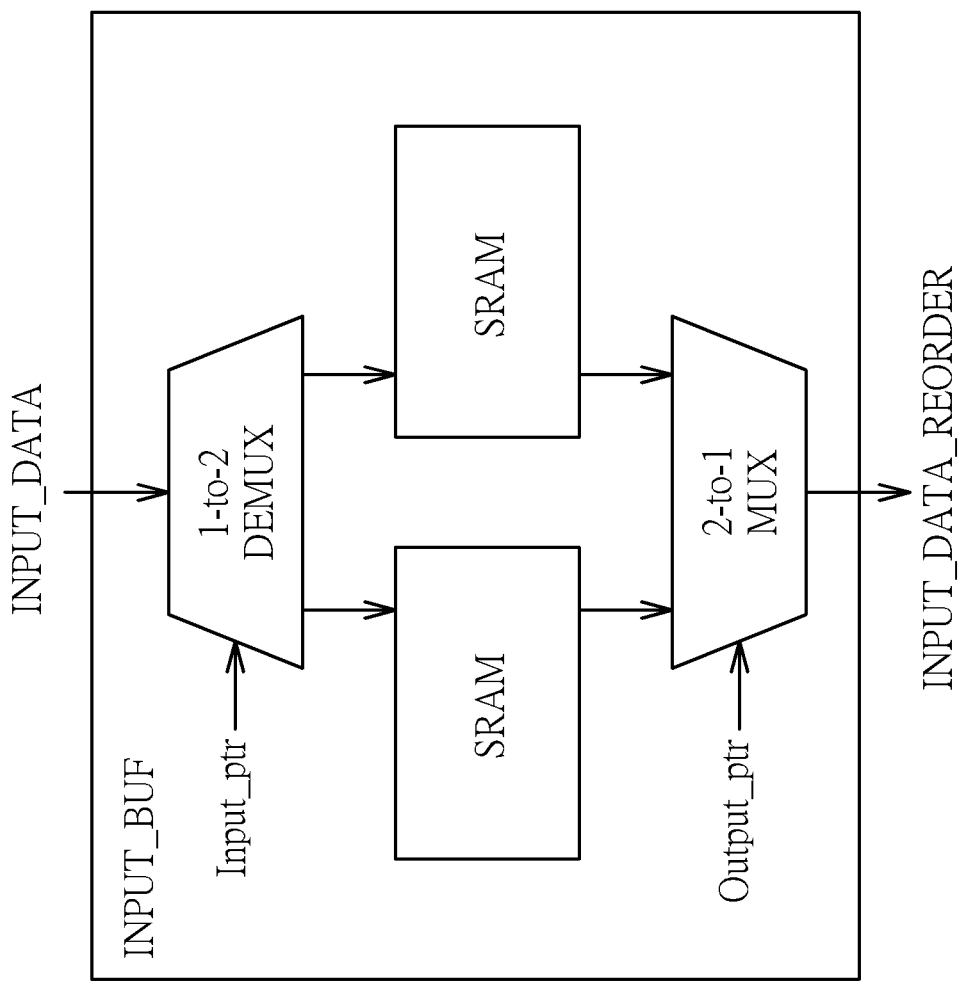
FIG. 10 illustrates a set of ping-pong buffers applicable to the AES engine shown in FIG. 9 according to an embodiment of the present invention.

FIG. 10 illustrates a set of ping-pong buffers (e.g. two SRAMs) applicable to the AES engine 11' shown in FIG. 9 according to an embodiment of the present invention, where an input buffer (labeled "INPUT_BUF" for brevity) comprising the set of ping-pong buffers can be taken as an example of any (e.g. each) of the encoding path input buffer 12E and the decoding path input buffer 12D shown in FIG. 9. In addition to the set of ping-pong buffers such as the two SRAMs, the input buffer may further comprise a 1-to-2 demultiplexer (DEMUX) and a 2-to-1 MUX. The 1-to-2 DEMUX and the 2-to-1 MUX can operate according to an input pointer inputptr and an output pointer outputptr, respectively, to buffer and output a series of sectors of the input data INPUT_DATA with the two SRAMs in turn. For example, the SRAM capacity of each of the two SRAMs can be the same as the capacity of a sector. With aid of alternating data-path selection statuses via the input pointer inputptr and the output pointer outputptr, the input buffer can perform the following operations:

(1) in a first time period, storing a first sector among the series of sectors into a first SRAM of these SRAMs;

(2) in a second time period, storing a second sector among the series of sectors into a second SRAM of these SRAMs and outputting the first sector;

(3) in a third time period, storing a third sector among the series of sectors into the first SRAM and outputting the second sector; and (4) in a fourth time period, storing a fourth sector among the series of sectors into the second SRAM and outputting the third sector;

where the rest can be deduced by analogy. For better comprehension, the input data INPUT_DATA and the reordered input data INPUT_DATA _REORDER can also be written as ENC/DEC_INPUT _DATA and ENC/DEC_INPUT _DATA_REORDER, respectively. When the input buffer shown in FIG. 10 is taken as an example of the encoding path input buffer 12E shown in FIG. 9, the input data INPUT_DATA and the reordered input data INPUT_DATA _REORDER may represent the input (e.g. the encoding input data ENC_INPUT _DATA) and the output (e.g. the reordered version of the encoding input data ENC_INPUT _DATA, such as the reordered encoding input data ENC_INPUT _DATA_REORDER on the encoding path) of the encoding path input buffer 12E, respectively. When the input buffer shown in FIG. 10 is taken as an example of the decoding path input buffer 12D shown in FIG. 9, the input data INPUT_DATA and the reordered input data INPUT_DATA _REORDER may represent the input (e.g. the decoding input data DEC_INPUT _DATA) and the output (e.g. the reordered version of the decoding input data DEC_INPUT _DATA, such as the reordered decoding input data DEC_INPUT _DATA_REORDER on the decoding path) of the decoding path input buffer 12D, respectively. For brevity, similar descriptions for this embodiment are not repeated in detail here.

Figure 11:
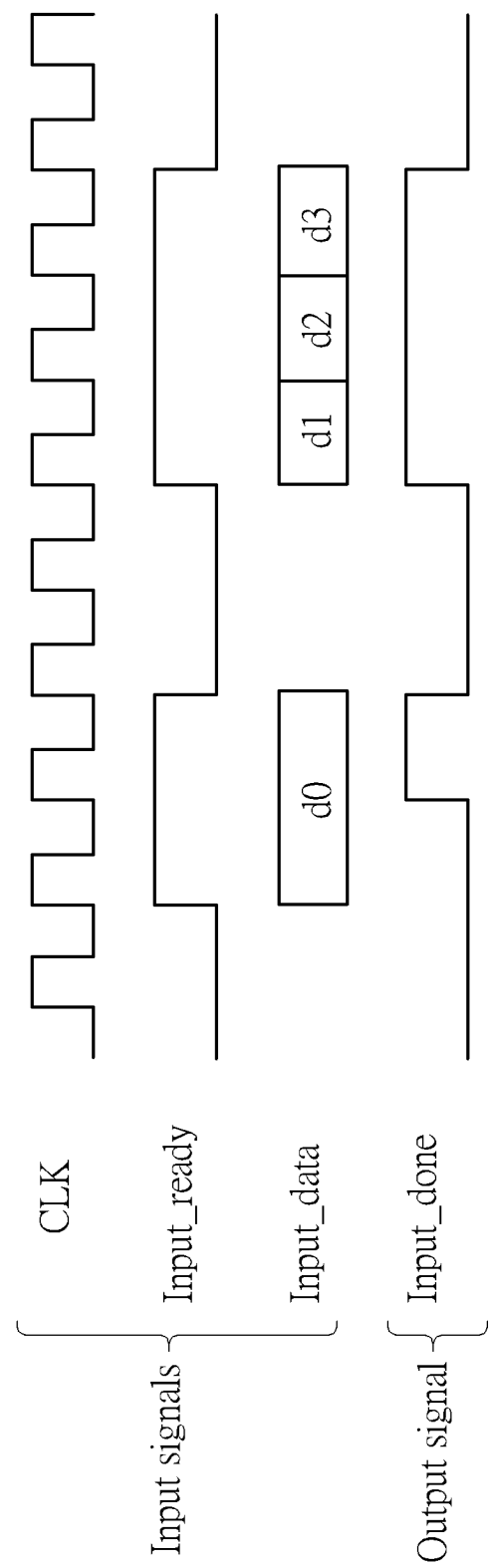
FIG. 11 illustrates some hand-shaking signals applicable to any AES engine of the AES engines respectively shown in FIG. 2 and FIG. 9 according to an embodiment of the present invention.
Figure 12:
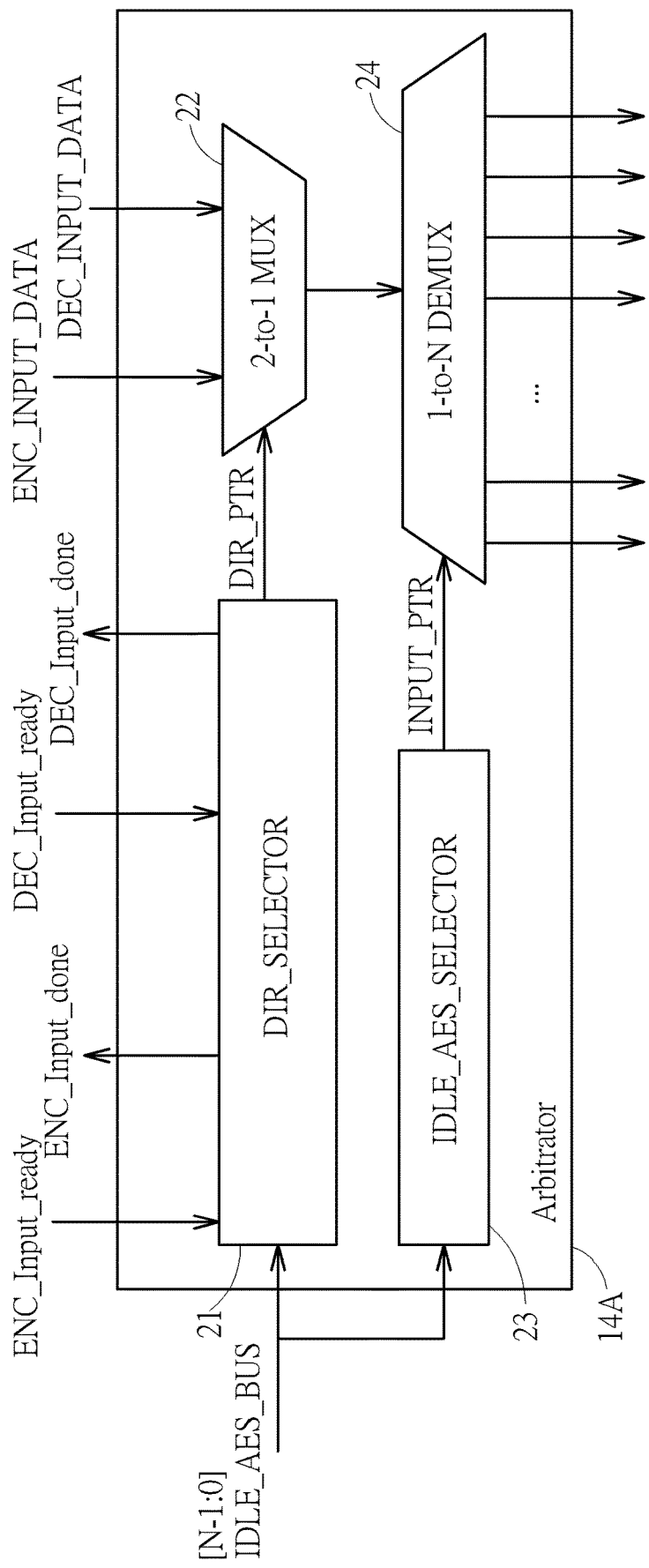
FIG. 12 illustrates some implementation details of the arbitrator in any of the AES engines respectively shown in FIG. 2 and FIG. 9 according to an embodiment of the present invention.

FIG. 11 illustrates some hand-shaking signals applicable to any AES engine (e.g. each AES engine) of the AES engines 11 and 11' respectively shown in FIG. 2 and FIG. 9 according to an embodiment of the present invention. When a first component is configured to output data to a second component of the any AES engine, the first component and the second component can utilize the hand-shaking signals to interact with each other. For example, the hand-shaking signals may comprise multiple input signals of the second component, such as a clock signal CLK, an input-ready signal Input_ready, and an input data signal Input_data, and may further comprise at least one output signal of the second component, such as an input-done signal Input_done. The first component can generate the multiple input signals of the second component for the second component, and utilize the input data signal Input_data to carry the data such as the partial data of d0, d1, d2, d3, etc. of the data, and utilize the input-ready signal Input_ready to indicate the respective timing for inputting the partial data d0, d1, d2, d3, etc. into the second component. In addition, the second component can utilize input-done signal Input_done to indicate the respective input-done status of the partial data d0, d1, d2, d3, etc. For example, when completely receiving the partial data d0, the second component can pull high the input-done signal Input_done, and then pull low the input-done signal Input_done at a time point when the input-ready signal Input_ready is pulled low. When completely receiving the partial data d1, d2, and d3, the second component can pull high the input-done signal Input_done, and then pull low the input-done signal Input_done at another time point when the input-ready signal Input_ready is pulled low. For better comprehension, the bit width of the input data signal Input_data can be 128 bits, and therefore can be expressed with a notation of [127:0]Input_data, but the present invention is not limited thereto. Additionally, regarding data transmission between any two components on any processing path of the encoding path and the decoding path in the any AES engine, the first component may represent the transmitting side of the any two components, and the second component may represent the receiving side of the any two components FIG. 12 illustrates some implementation details of the arbitrator 14A in any (e.g. each) of the AES engines 11 and 11' respectively shown in FIG. 2 and FIG. 9 according to an embodiment of the present invention. For better comprehension, assume that there are N ENDEC circuits {ENDEC (0), ENDEC(1), . . . , ENDEC(N−1)} in the multiple ENDEC circuits 14C. The arbitrator 14A may comprise a direction selector 21 (labeled "DIR_SELECTOR" for brevity), a 2-to-1 MUX 22, an idle AES selector 23 (labeled "IDLE_ABS _SELECTOR"), and a 1-to-N DEMUX 24. The arbitrator 14A (e.g. the direction selector 21) can utilize a first set of hand-shaking signals such as an input-ready signal ENC_Input_ready, an input-done signal ENC_Input_done, etc. to interact with the encoding input control circuit 13E in a similar manner as that described in the embodiment shown in FIG. 11, where regarding inputting data from the encoding input control circuit 13E into the arbitrator 14A, the encoding input control circuit 13E and the arbitrator 14A can play the role of the first component and the role of the second component, respectively. Similarly, the arbitrator 14A (e.g. the direction selector 21) can utilize a second set of hand-shaking signals such as an input-ready signal DEC_Input_ready, an input-done signal DEC_Input_done, etc. to interact with the decoding input control circuit 13D in a similar manner as that described in the embodiment shown in FIG. 11, where regarding inputting data from the decoding input control circuit 13D into the arbitrator 14A, the decoding input control circuit 13D and the arbitrator 14A can play the role of the first component and the role of the second component, respectively.

The arbitrator 14A (e.g. the direction selector 21) can operate according to the input-ready signal ENC_Input_ready generated by the encoding input control circuit 13E, the input-ready signal DEC_Input_ready generated by the decoding input control circuit 13D, and an idle AES bus signal IDLE_ABS _BUS. For example, the idle AES bus signal IDLE_ABS _BUS has a bit width of N bits, and therefore can also be referred to as the idle AES bus signal [N−1:0]IDLE_AES _BUS (e.g. "[N−1:0]" in this notation may indicate the bit width), where the N bits {IDLE_ABS _BUS[0], IDLE_ABS _BUS[1], . . . , IDLE_ABS _BUS[N−1]} of the idle AES bus signal IDLE_ABS _BUS indicate whether the N ENDEC circuits {ENDEC(0), ENDEC(1), ENDEC(N−1)} are idle, respectively, and possible logical values 1 and 0 of any bit IDLE_ABS _BUS[n] (e.g. n=0, 1, . . . , or N−1) of the N bits {IDLE_ABS _BUS[0], IDLE_ABS _BUS[1], . . . , IDLE_ABS _BUS[N−1]} represent idle and non-idle/busy states of the ENDEC circuit ENDEC(n), respectively.

As shown in FIG. 12, the direction selector 21 can generate a direction pointer DIR_PTR according to the idle AES bus signal IDLE_AES _BUS, the input-ready signal ENC_Input_ready, and the input-ready signal DEC_Input_ready, dynamically return a latest status (e.g. a status regarding whether inputting data from the encoding input control circuit 13E into the arbitrator 14A is completed) to the encoding input control circuit 13E through the input-done signal ENC_Input_done, and dynamically return a latest status (e.g. a status regarding whether inputting data from the decoding input control circuit 13D into the arbitrator 14A is completed) to the decoding input control circuit 13D through the input-done signal DEC_Input_done, where the direction pointer DIR_PTR may indicate whether the arbitrator 14A should input (e.g. receive) the input data on the encoding path or the input data on the decoding path.

For example, when the direction pointer DIR_PTR indicates that the arbitrator 14A should input (e.g. receive) the input data on the encoding path (e.g. DIR_PTR=0, which may represent a state "ENC" corresponding to the encoding path), the 2-to-1 MUX 22 can input the input data on the encoding path (e.g. the encoding input data ENC_INPUT_DATA for the architecture shown in FIG. 2, or the reordered version thereof such as the reordered encoding input data ENC_INPUT _DATA_REORDER for the architecture shown in FIG. 9). For another example, when the direction pointer DIR_PTR indicates that the arbitrator 14A should input (e.g. receive) the input data on the decoding path (e.g. DIR_PTR=1, which may represent a state "DEC" corresponding to the decoding path), the 2-to-1 MUX 22 can input the input data on the decoding path (e.g.

the decoding input data DEC_INPUT_DATA for the architecture shown in FIG. 2, or the reordered version thereof such as the reordered decoding input data DEC_INPUT_DATA_REORDER for the architecture shown in FIG. 9).

In addition, the idle AES selector 23 can generate an input pointer INPUT_PTR according to the idle AES bus signal IDLE_AES_BUS, where the input pointer INPUT_PTR may indicate a target ENDEC circuit among the N ENDEC circuits {ENDEC(0), ENDEC(1), ..., ENDEC(N-1)}, for controlling the 1-to-N DEMUX 24 to deliver the input data selected by the 2-to-1 MUX 22 to the target ENDEC circuit. For better comprehension, possible values of the input pointer INPUT_PTR may comprise {0, 1, ..., N-1}, and these possible values {0, 1, ... N-1} the input pointer INPUT_PTR may correspond to the N ENDEC circuits {ENDEC(0), ENDEC(1), ..., ENDEC(N-1)}, respectively. In this situation, the target ENDEC circuit may represent the ENDEC circuit ENDEC(INPUT_PTR). For example, when INPUT_PTR=0, the 1-to-N DEMUX 24 can send the input data selected by the 2-to-1 MUX 22 to the ENDEC circuit ENDEC(0); when INPUT_PTR=1, the 1-to-N DEMUX 24 can send the input data selected by the 2-to-1 MUX 22 to the ENDEC circuit ENDEC(1); ... and when INPUT_PTR=N-1, the 1-to-N DEMUX 24 can send the input data selected by the 2-to-1 MUX 22 to the ENDEC circuit ENDEC(N-1).

Figure 13:
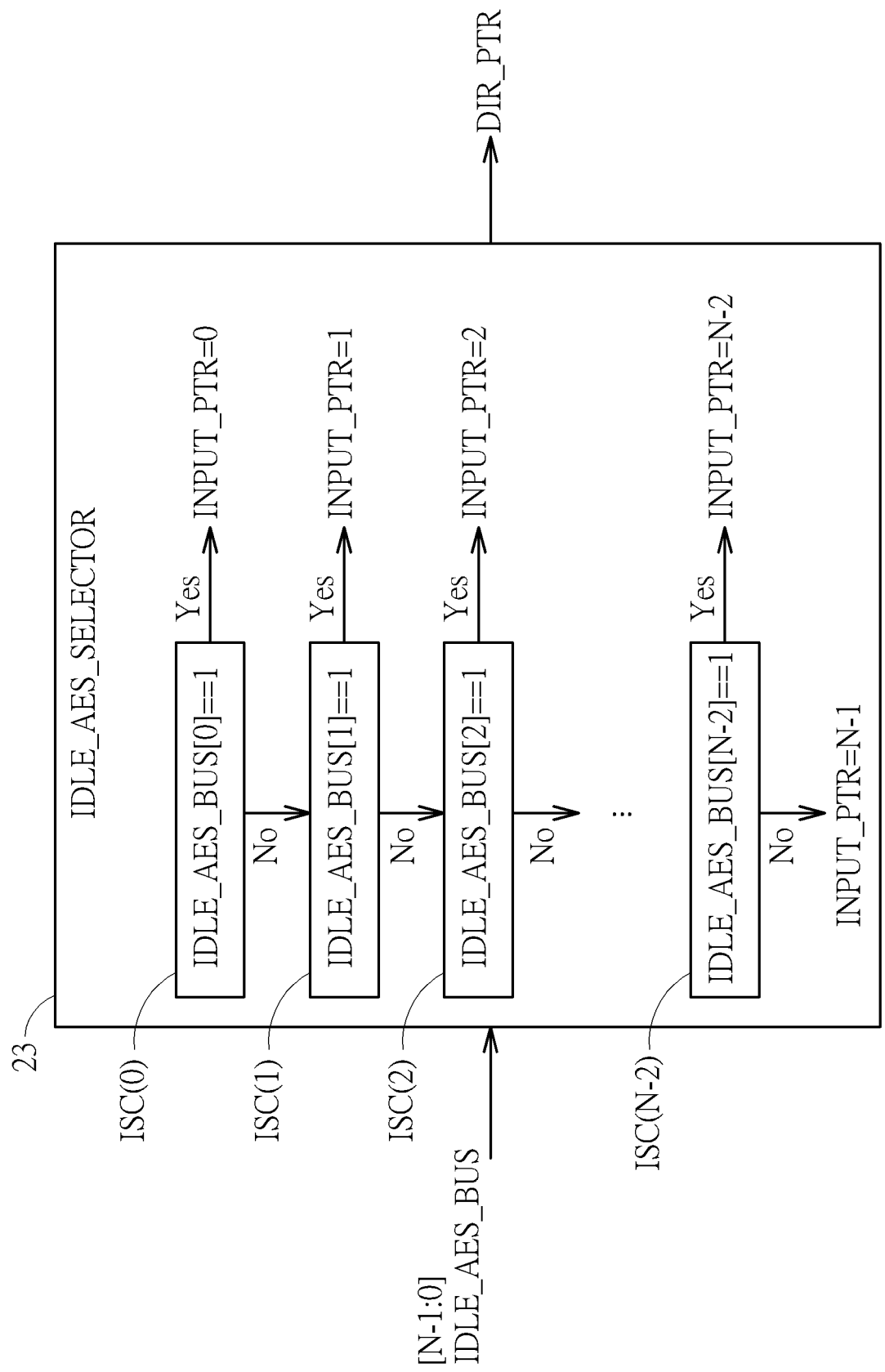
FIG. 13 illustrates some implementation details of the idle AES selector shown in FIG. 12 according to an embodiment of the present invention.

FIG. 13 illustrates some implementation details of the idle AES selector 23 shown in FIG. 12 according to an embodiment of the present invention. The idle AES selector 23 can be configured to select an idle AES ENDEC circuit such as the ENDEC circuit ENDEC(INPUT_PTR) according to the idle AES bus signal IDLE_AES_BUS, to be the target ENDEC circuit. As shown in FIG. 13, the idle AES selector 23 may comprise multiple sub-circuits such as {ISC(0), ISC(1), ISC(2), ..., ISC(N-2)} (respectively labeled "IDLE_AES_BUS[0]==1", "IDLE_AES_BUS[1]==1", "IDLE_AES_BUS[2]==1", ... and "IDLE_AES_BUS[N-2]==1" for better comprehension), for selecting the idle AES ENDEC circuit with the minimum index available. For example, when IDLE_AES_BUS[0]==1 (e.g. the ENDEC circuit ENDEC(0) is idle), the sub-circuit ISC(0) can set INPUT_PTR=0; otherwise, when IDLE_AES_BUS[1]==1 (e.g. the ENDEC circuit ENDEC(1) is idle), the sub-circuit ISC(1) can set INPUT_PTR=1; otherwise, when IDLE_AES_BUS[2]==2 (e.g. the ENDEC circuit ENDEC(2) is idle), the sub-circuit ISC(2) can set INPUT_PTR=2; ...; otherwise, when IDLE_AES_BUS[N-2]==1 (e.g. the ENDEC circuit ENDEC(N-2) is idle), the sub-circuit ISC(N-2) can set INPUT_PTR=N-2, otherwise, the sub-circuit ISC(N-2) can set INPUT_PTR=N-1.

Figure 14:
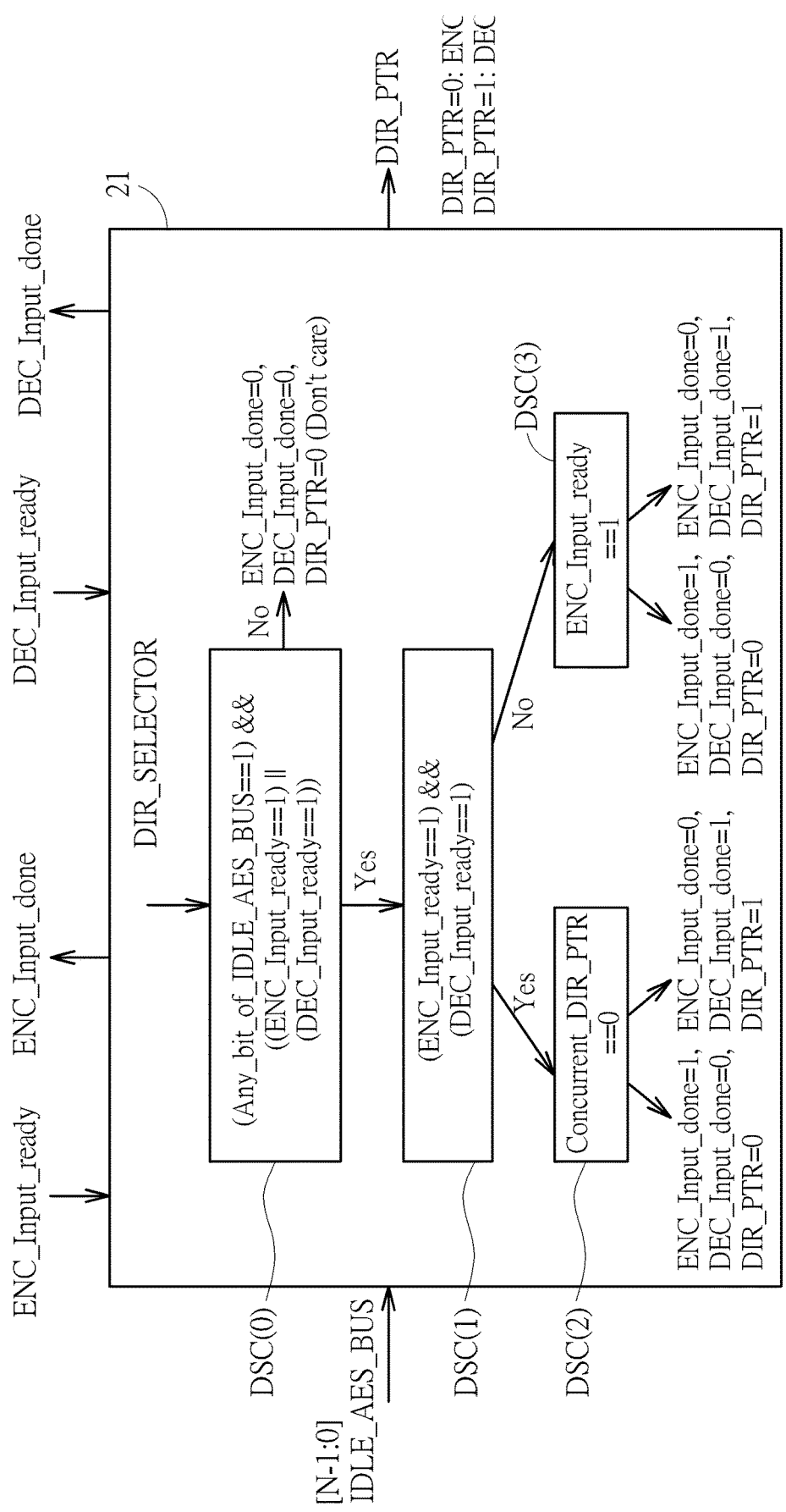
FIG. 14 illustrates some implementation details of the direction selector shown in FIG. 12 according to an embodiment of the present invention.

FIG. 14 illustrates some implementation details of the direction selector 21 shown in FIG. 12 according to an embodiment of the present invention. The direction selector 21 can be configured to select one direction to be served among the aforementioned different data transmission directions (e.g. the read-related data transmission direction and the write-related data transmission direction). As shown in FIG. 14, the direction selector 21 may comprise multiple sub-circuits such as {DSC(0), DSC(1), DSC(2), DSC(3)} (respectively labeled "(Any_bit_of_IDLE_AES_BUS==1) && ((ENC_Input_ready==1)||(DEC_Input_ready==1))", "(ENC_Input_ready==1) && (DEC_Input_ready==1)", "Concurrent_DIR_PTR==0" and "ENC_Input_ready==1" for better comprehension), for determine proper logical values of the direction pointer DIR_PTR, the input-done signal ENC_Input_done and the input-done signal DEC_Input_done. For example, the direction selector 21 (e.g. the sub-circuit DSC(0) can determine the flag Any_bit_of_IDLE_AES_BUS according to whether any bit of the idle AES bus signal IDLE_AES_BUS is equal to 1, and more particularly, can determine that Any_bit_of_IDLE_AES_BUS=1 when it is TRUE that any bit of the idle AES bus signal IDLE_AES_BUS is equal to 1, or determine that Any_bit_of_IDLE_AES_BUS=0 when it is FAUSE that any bit of the idle AES bus signal IDLE_AES_BUS is equal to 1.

When it is FALSE that (Any_bit_of_IDLE_AES_BUS==1) && ((ENC_Input_ready==1)||(DEC_Input_ready==1)), the sub-circuit DSC(0) can set ENC_Input_done=0, DEC_Input_done=0, and DIR_PTR=0, where the sub-circuit DSC(0) can arbitrarily set DIR_PTR=0 or DIR_PTR=1 (e.g. "Don't care") in this situation; otherwise (e.g. (Any_bit_of_IDLE_AES_BUS==1) && ((ENC_Input_ready==1)||(DEC_Input_ready==1)) is TRUE), when (ENC_Input_ready==1) && (DEC_Input_ready==1), the sub-circuit DSC(1) can control the sub-circuit DSC(2) to perform the subsequent processing, otherwise (e.g. (ENC_Input_ready==1) && (DEC_Input_ready==1) is FALSE), the sub-circuit DSC(1) can control the sub-circuit DSC(3) to perform the subsequent processing; when Concurrent_DIR_PTR==0, the sub-circuit DSC(2) can set ENC_Input_done=1, DEC_Input_done=0, and DIR_PTR=0, otherwise, the sub-circuit DSC(2) can set ENC_Input_done=0, DEC_Input_done=1, and DIR_PTR=1, where the flag Concurrent_DIR_PTR will be explained later; and when ENC_Input_ready==1, the sub-circuit DSC(3) can set ENC_Input_done=1, DEC_Input_done=0, and DIR_PTR=0, otherwise, the sub-circuit DSC(3) can set ENC_Input_done=0, DEC_Input_done=1, and DIR_PTR=1.

The direction selector 21 can control the input-done signal ENC_Input_done and the input-done signal DEC_Input_done in a similar manner as that described in the embodiment shown in FIG. 11. When ENC_Input_done=1, the direction selector 21 can set the input-done signal ENC_Input_done to have a high voltage level; otherwise (e.g. ENC_Input_done=0), the direction selector 21 can set the input-done signal ENC_Input_done to have a low voltage level. Similarly, when DEC_Input_done=1, the direction selector 21 can set the input-done signal DEC_Input_done to have a high voltage level; otherwise (e.g. DEC_Input_done=0), the direction selector 21 can set the input-done signal DEC_Input_done to have a low voltage level. For brevity, similar descriptions for this embodiment are not repeated in detail here.

Figure 15:
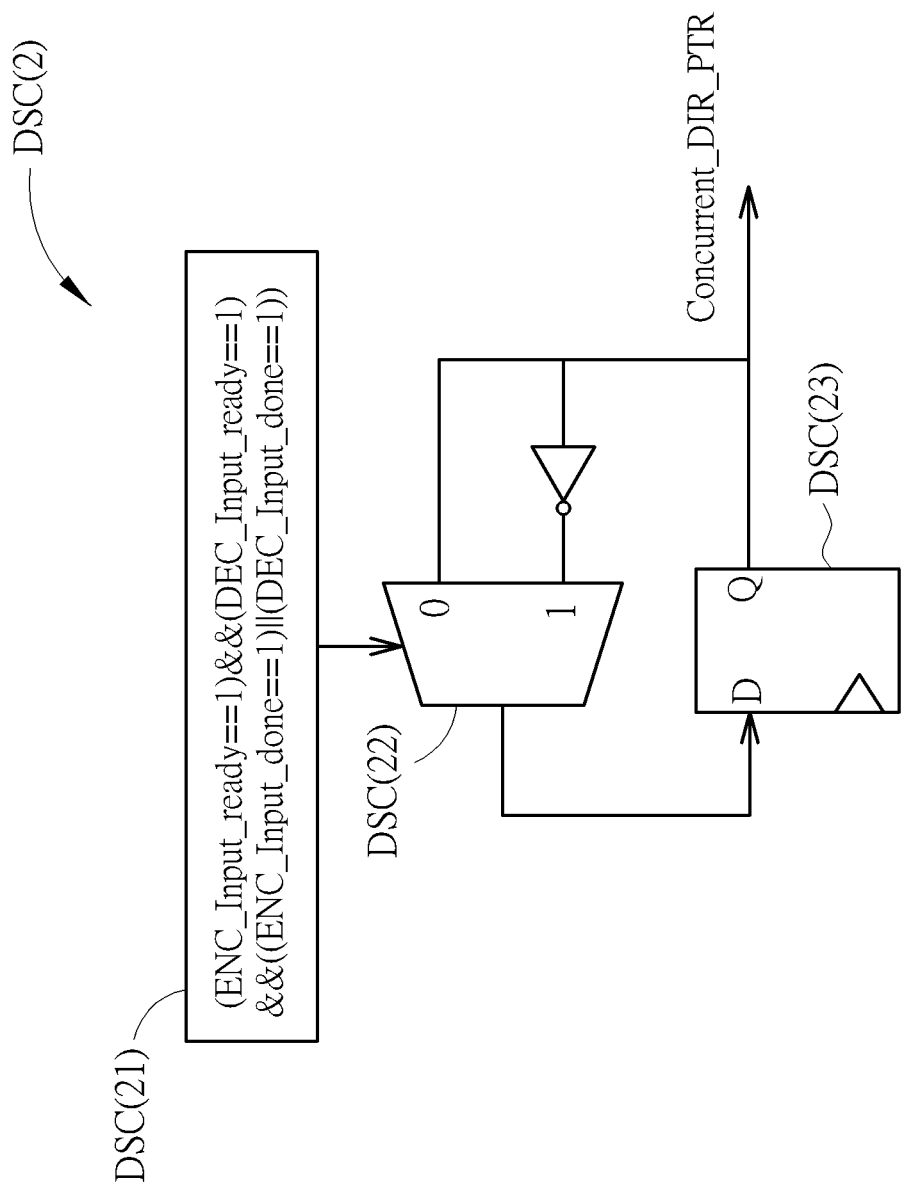
FIG. 15 illustrates some implementation details of a sub-circuit of the direction selector shown in FIG. 14 according to an embodiment of the present invention.

FIG. 15 illustrates some implementation details of the sub-circuit DSC(2) of the direction selector 21 shown in FIG. 14 according to an embodiment of the present invention. The sub-circuit DSC(2) may comprise multiple sub-circuits such as {DSC(21), DSC(22), DSC(23)}, for determining the flag Concurrent_DIR_PTR. The sub-circuit DSC(21) (labeled "(ENC_Input_ready==1) && (DEC_Input_ready==1) && ((ENC_Input_done==1)||(DEC_Input_done==1))" for better comprehension) can determine whether (ENC_Input_ready==1) && (DEC_Input_ready==1) && ((ENC_Input_done==1)||(DEC_Input_done==1)) is TRUE or FALSE to control the sub-circuit DSC(22) such as a MUX correspondingly. When (ENC_Input_ready==1) && (DEC_Input_ready==1) && ((ENC_Input_done==1)||(DEC_Input_done==1)) is TRUE, the sub-circuit DSC(22) such as the MUX select the input path corresponding to the logical value 1 (e.g. the lower input path thereof); otherwise, the sub-circuit DSC(22) such as the MUX select the input path corresponding to the logical value 0 (e.g. the upper input path thereof). Based on the architecture shown in FIG. 15, the sub-circuit DSC(23) such as a D-type flip-flop can generate the flag Concurrent_DIR_PTR according to the output of the sub-circuit DSC(22). For example, the arbitrator 14A, the encoding input control circuit 13E and the decoding input control circuit 13D may utilize the same clock signal such as the clock signal CLK, and the sub-circuit DSC(23) may operate according to the clock signal CLK, but the present invention is not limited thereto.

Figure 16:
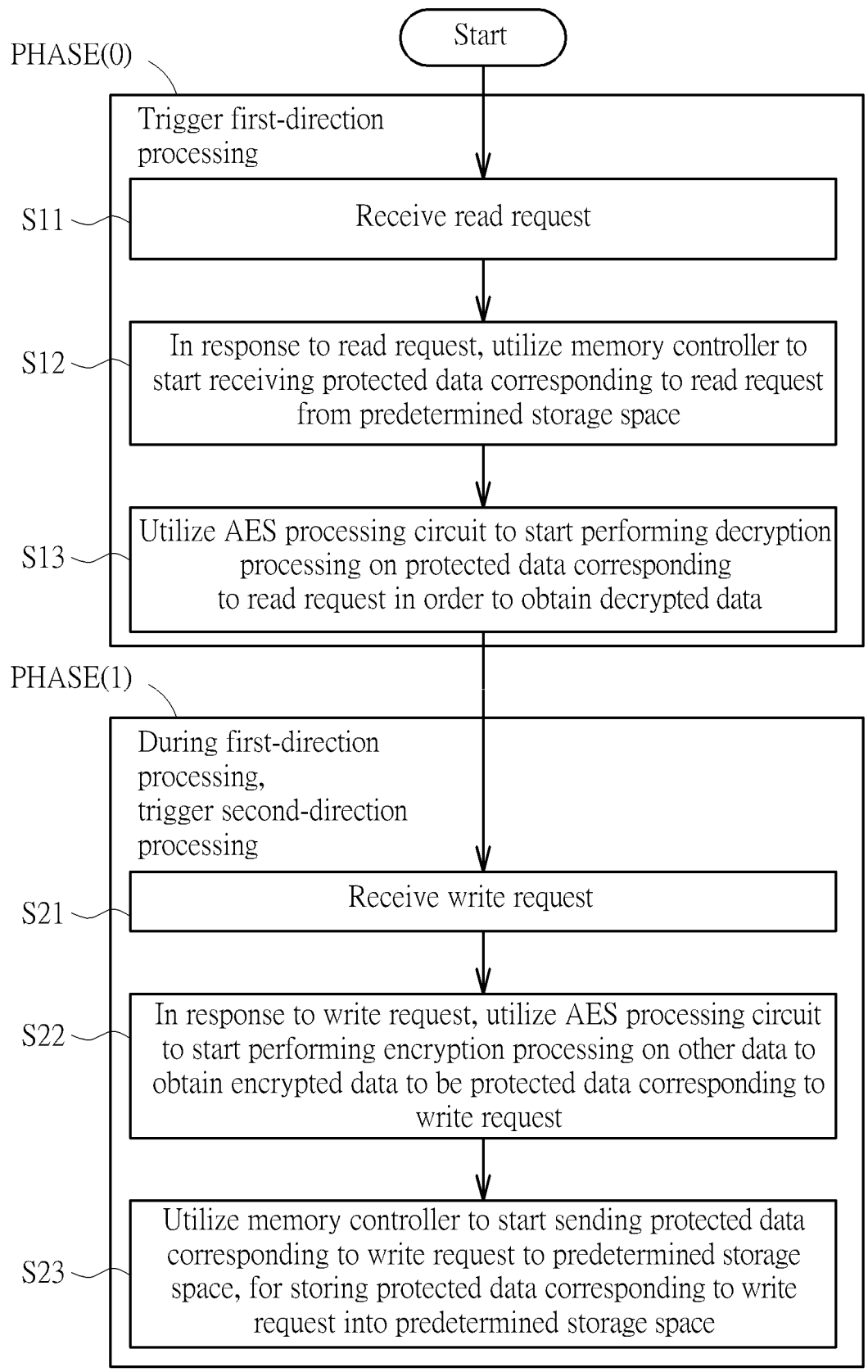
FIG. 16 illustrates a working flow of a data accessing method using data protection with aid of an AES processing circuit according to an embodiment of the present invention.

FIG. 16 illustrates a working flow of a data accessing method using data protection with aid of the AES processing circuit (e.g. the FDDTA type AES processing circuit 115A) according to an embodiment of the present invention, where the data accessing method is applicable to the memory controller 110 of the memory device 100. For better comprehension, a first set of operations comprise operations of Steps S11-S13, and a second set of operations comprise operations of Steps S21-S23. For example, Steps S11-S13 can be performed in a first phase such as PHASE(0), and Steps S21-S23 can be performed in a second phase such as PHASE(1), but the present invention is not limited thereto. For another example, the order of executing Steps S11-S13 and executing Steps S21-S23 can be exchanged, to make Steps S21-S23 be performed in the first phase such as PHASE(0) and make Steps S11-S13 be performed in the second phase such as PHASE(1).

In the first phase such as PHASE(0), the memory device 100 (e.g. the memory controller 110) can be configured to trigger first-direction processing, where the first-direction processing may comprise one set of operations among the first and the second sets of operations, such as the operations of Steps S11-S13.

In Step S11, the memory device 100 (e.g. the memory controller 110) can receive a read request from the host device 10.

In Step S12, in response to the read request, the memory device 100 can utilizing the memory controller 110 to start receiving protected data corresponding to the read request from predetermined storage space. For example, the predetermined storage space may represent the storage space of the NV memory 120.

In Step S13, after starting receiving the protected data corresponding to the read request, the memory device 100 (e.g. the memory controller 110) can utilize the AES processing circuit such as the FDDTA type AES processing circuit 115A to start performing decryption processing on the protected data corresponding to the read request in order to obtain decrypted data, where the AES processing circuit is implemented within the memory controller 110.

In the second phase such as PHASE(1), during the first-direction processing (e.g. before completion of the first-direction processing), the memory device 100 (e.g. the memory controller 110) can be configured to trigger second-direction processing, where the second-direction processing may comprise another set of operations among the first and the second sets of operations, such as the operations of Steps S21-S23.

In Step S21, the memory device 100 (e.g. the memory controller 110) can receive a write request from the host device 10.

In Step S22, in response to the write request, the memory device 100 (e.g. the memory controller 110) can utilize the AES processing circuit such as the FDDTA type AES processing circuit 115A to start performing encryption processing on other data to obtain encrypted data to be protected data corresponding to the write request.

In Step S23, after starting performing the encryption processing, the memory device 100 can utilize the memory controller 110 to start sending the protected data corresponding to the write request to the predetermined storage space (e.g. the storage space of the NV memory 120), for storing the protected data corresponding to the write request into the predetermined storage space.

Regarding triggering the second-direction processing during the first-direction processing, the AES processing circuit such as the FDDTA type AES processing circuit 115A can be configured to perform at least one portion (e.g. a portion or all) of the encryption processing and at least one portion (e.g. a portion or all) of the decryption processing at the same time, to allow the memory device 100 to perform the processing respectively corresponding to the aforementioned different data transmission directions (e.g. the read-related data transmission direction and the write-related data transmission direction) at the same time. For brevity, similar descriptions for this embodiment are not repeated in detail here.

For better comprehension, the data accessing method may be illustrated with the working flow shown in FIG. 16, but the present invention is not limited thereto. According to some embodiments, one or more steps may be added, deleted, or changed in the working flow shown in FIG. 16. For example, the read request and the write request may be implemented as internal requests of the memory device 100 (e.g. the memory controller 110), where the operation of Step S11 may be replaced with an operation of obtaining the read request such as an internal read request, and the operation of Step S21 may be replaced with an operation of obtaining the write request such as an internal write request. In addition, the predetermined storage space may represent external storage space of the memory device 100.

According to some embodiments, the memory device 100 (e.g. the memory controller 110) can utilize a portion of memory space of the host device 50, such as that of a memory (e.g. RAM) within the host device 50, as the external storage space of the memory device 100, for use of management of the memory device 100. More particularly, the memory device 100 (e.g. the memory controller 110) can send internal information of the memory device 100 to the host device 50 to be stored in the external storage space (e.g. the memory within the host device 50), and can obtain or retrieve at least one portion (e.g. a portion or all) of the internal information from the external storage space when needed. In addition, the AES processing such as that described in one or more of the embodiments described above can be applied to data accessing regarding the external storage space. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data accessing method using data protection with aid of an Advanced Encryption Standard (AES) processing circuit, the data accessing method being applicable to a memory controller of a memory device, the memory device comprising the memory controller and a non-volatile (NV) memory, the NV memory comprising at least one NV memory element, the AES processing circuit comprising at least one encoding path and at least one decoding path respectively corresponding to encryption processing and decryption processing, and further comprising multiple encoder-decoder (ENDEC) circuits for parallel processing, both of the encoding path and the decoding path passing an arbitrator implemented within the AES processing circuit, the data accessing method comprising:

utilizing the memory controller to start receiving first protected data corresponding to a read request from predetermined storage space;

after starting receiving the first protected data corresponding to the read request, utilizing the AES processing circuit to start performing the decryption processing on the first protected data to obtain decrypted data, wherein the AES processing circuit is implemented within the memory controller;

utilizing the AES processing circuit to start performing the encryption processing on other data to obtain encrypted data to be second protected data corresponding to a write request; and after starting performing the encryption processing, utilizing the memory controller to start sending the second protected data to the predetermined storage space, for storing the second protected data into the predetermined storage space;

wherein the AES processing circuit is arranged to perform at least one portion of the encryption processing and at least one portion of the decryption processing at the same time; and the method further comprises:

utilizing the arbitrator to selectively receive input data on the encoding path or on the decoding path;

utilizing the arbitrator to select an idle ENDEC circuit from the multiple ENDEC circuits according to an idle bus signal within the AES processing circuit; and utilizing the arbitrator to deliver the received input data to the idle ENDEC circuit.

2. The data accessing method of claim 1, wherein the AES processing circuit is arranged to perform the at least one portion of the encryption processing and the at least one portion of the decryption processing at the same time, to allow the memory device to perform processing respectively corresponding to different data transmission directions at the same time.

3. The data accessing method of claim 2, wherein said different data transmission directions comprise a read-related data transmission direction and a write-related data transmission direction.

4. The data accessing method of claim 1, wherein a first set of operations comprise an operation of utilizing the memory controller to start receiving the first protected data from the predetermined storage space and an operation of utilizing the AES processing circuit to start performing the decryption processing on the first protected data to obtain the decrypted data; a second set of operations comprise an operation of utilizing the AES processing circuit to start performing the encryption processing on the other data to obtain the encrypted data to be the second protected data and an operation of utilizing the memory controller to start sending the second protected data to the predetermined storage space; in a first phase, the memory controller is arranged to trigger first-direction processing, wherein the first-direction processing comprises one set of operations among the first and the second sets of operations; and in a second phase, during the first-direction processing, the memory controller is arranged to trigger second-direction processing, wherein the second-direction processing comprises another set of operations among the first and the second sets of operations.

5. The data accessing method of claim 1, wherein any of the multiple ENDEC circuits is applicable to any of the encryption processing and the decryption processing; and the data accessing method further comprises:

utilizing the arbitrator implemented within the AES processing circuit to manage the multiple ENDEC circuits to dynamically operate on the at least one decoding path and the at least one encoding path, to make the AES processing circuit perform the at least one portion of the encryption processing and the at least one portion of the decryption processing at the same time.

6. The data accessing method of claim 5, wherein the any of the multiple ENDEC circuits is applicable to the encryption processing, and is also applicable to the decryption processing.

7. A memory controller of a memory device, the memory device comprising the memory controller and a non-volatile (NV) memory, the NV memory comprising at least one NV memory element, the memory controller comprising:

a processing circuit, arranged to control the memory controller according to a plurality of host commands from a host device, to allow the host device to access the NV memory through the memory controller; and a data protection circuit, coupled to the processing circuit, arranged to perform data protection, wherein the data protection circuit comprises:

an Advanced Encryption Standard (AES) processing circuit, arranged to perform AES processing, for data protection during data accessing, wherein the AES processing circuit comprises at least one encoding path and at least one decoding path respectively corresponding to encryption processing and decryption processing, and further comprises multiple encoder-decoder (ENDEC) circuits for parallel processing, and both of the encoding path and the decoding path pass an arbitrator implemented within the AES processing circuit;

wherein:

the memory controller starts receiving first protected data corresponding to a read request from predetermined storage space;

after starting receiving the first protected data corresponding to the read request, the memory controller utilizes the AES processing circuit to start performing the decryption processing on the first protected data to obtain decrypted data, wherein the AES processing circuit is implemented within the memory controller;

the memory controller utilizes the AES processing circuit to start performing the encryption processing on other data to obtain encrypted data to be second protected data corresponding to a write request; and after starting performing the encryption processing, the memory controller starts sending the second protected data to the predetermined storage space, for storing the second protected data into the predetermined storage space;

wherein the AES processing circuit performs at least one portion of the encryption processing and at least one portion of the decryption processing at the same time, wherein:

the arbitrator selectively receives input data on the encoding path or on the decoding path;

the arbitrator selects an idle ENDEC circuit from the multiple ENDEC circuits according to an idle bus signal within the AES processing circuit; and the arbitrator delivers the received input data to the idle ENDEC circuit.

8. The memory device comprising the memory controller of claim 7, wherein the NV memory is arranged to store information; and the memory controller is coupled to the NV memory, and is arranged to control operations of the memory device.

9. An Advanced Encryption Standard (AES) processing circuit of a memory controller of a memory device, the memory device comprising the memory controller and a non-volatile (NV) memory, the memory controller comprising the AES processing circuit, the NV memory comprising at least one NV memory element, the AES processing circuit comprising:

multiple encoder-decoder (ENDEC) circuits having encoding and decoding capabilities, arranged to perform parallel processing, wherein during the parallel processing, any of the multiple ENDEC circuits performs any of encoding and decoding; and an arbitrator, coupled to the multiple ENDEC circuits, arranged to manage the multiple ENDEC circuits, for performing the parallel processing, wherein the AES processing circuit comprises at least one encoding path and at least one decoding path respectively corresponding to encryption processing and decryption processing, and both of the encoding path and the decoding path pass the arbitrator implemented within the AES processing circuit;

wherein:

the memory controller starts receiving first protected data corresponding to a read request from predetermined storage space;

after starting receiving the first protected data corresponding to the read request, the memory controller utilizes the AES processing circuit to start performing the decryption processing on the first protected data to obtain decrypted data, wherein the AES processing circuit is implemented within the memory controller;

the memory controller utilizes the AES processing circuit to start performing the encryption processing on other data to obtain encrypted data to be second protected data corresponding to a write request; and after starting performing the encryption processing, the memory controller starts sending the second protected data to the predetermined storage space, for storing the second protected data into the predetermined storage space;

wherein the AES processing circuit performs at least one portion of the encryption processing and at least one portion of the decryption processing at the same time, wherein:

the arbitrator selectively receives input data on the encoding path or on the decoding path;

the arbitrator selects an idle ENDEC circuit from the multiple ENDEC circuits according to an idle bus signal within the AES processing circuit; and the arbitrator delivers the received input data to the idle ENDEC circuit.

10. The AES processing circuit of claim 9, wherein the any of the multiple ENDEC circuits is applicable to any of the encryption processing and the decryption processing; and the arbitrator manages the multiple ENDEC circuits to dynamically operate on the at least one decoding path and the at least one encoding path, to make the AES processing circuit perform the at least one portion of the encryption processing and the at least one portion of the decryption processing at the same time.

* * * * *